US012102270B2

(12) United States Patent
Murphy et al.

(10) Patent No.: US 12,102,270 B2
(45) Date of Patent: Oct. 1, 2024

(54) SYSTEMS AND METHODS FOR PRODUCT LEVEL TRACKING OF SHEET PRODUCT ROLLS

(71) Applicant: GPCP IP Holdings LLC, Atlanta, GA (US)

(72) Inventors: David Warren Murphy, Neenah, WI (US); Timothy Andrew Robertson, Appleton, WI (US); Kevin Michael Swanson, Larsen, WI (US); Ryan Anthony Goltz, Neenah, WI (US)

(73) Assignee: GPCP IP HOLDINGS LLC

( * ) Notice: Subject to any disclaimer, the term of this patent is extended or adjusted under 35 U.S.C. 154(b) by 0 days.

(21) Appl. No.: 18/125,759

(22) Filed: Mar. 24, 2023

(65) Prior Publication Data

US 2023/0225570 A1    Jul. 20, 2023

Related U.S. Application Data

(63) Continuation of application No. 17/065,807, filed on Oct. 8, 2020, now Pat. No. 11,617,478.
(Continued)

(51) Int. Cl.
*A47K 10/38* (2006.01)
*G01B 11/14* (2006.01)

(52) U.S. Cl.
CPC .............. *A47K 10/38* (2013.01); *G01B 11/14* (2013.01); *A47K 2010/389* (2013.01)

(58) Field of Classification Search
None
See application file for complete search history.

(56) References Cited

U.S. PATENT DOCUMENTS 4,204,180 A    5/1980   Inukai et al.
4,422,402 A   12/1983   Ogihara
(Continued)

FOREIGN PATENT DOCUMENTS

CA    2552123 C    3/2012
CA    2893982 A1   6/2014
(Continued)

OTHER PUBLICATIONS

"A Brief Introduction to Time-of-Flight Sensing Part 2—Indirect ToF Sensors;" TERABEE; retrieved Nov. 18, 2020 from https://www.terabee.com/a-brief-introduction-to-time-offlight-sensing-part-2-indirect-tof-sensors/.
(Continued)

*Primary Examiner* — William A. Rivera

(57) ABSTRACT

Systems, devices, and methods for providing a sheet product dispenser with automated product level tracking functionality are provided herein. Various product level sensors are disclosed herein including a product level sensor configured to emit a signal toward an outer circumference of a sheet product roll on a spindle extending along a longitudinal axis and to receive a reflected signal. The product level sensor is positioned a radial distance away from the spindle and aimed to emit the signal in a direction that is not parallel and not perpendicular to the longitudinal axis. The product level sensor detects a parameter of the reflected signal corresponding to the distance between the product level sensor and the sheet product roll. Other example embodiments include mechanical product level sensors. Various communication protocols may be employed to limit transmission of data to conserve battery life while still maintaining desired communication functionality.

22 Claims, 19 Drawing Sheets

Related U.S. Application Data

(60) Provisional application No. 63/039,061, filed on Jun. 15, 2020, provisional application No. 62/912,751, filed on Oct. 9, 2019.

(56) References Cited

U.S. PATENT DOCUMENTS

| | | |
|---|---|---|
| 4,882,568 A | 11/1989 | Kyser et al. |
| 5,417,233 A | 5/1995 | Thomas |
| 5,691,919 A | 11/1997 | Gemmell et al. |
| 5,852,946 A | 12/1998 | Cowger |
| 5,878,381 A | 3/1999 | Mcconnell |
| 6,143,257 A | 11/2000 | Spriggs |
| 6,310,574 B1 | 10/2001 | Fehrenbach |
| 6,360,181 B1 | 3/2002 | Oyler |
| 6,411,920 B1 | 6/2002 | McConnell |
| 6,585,344 B2 | 7/2003 | Kolodziej |
| 6,598,473 B2 | 7/2003 | Atkinson |
| 6,640,628 B2 | 11/2003 | Luetke et al. |
| 6,895,296 B2 | 5/2005 | Holt |
| 7,044,421 B1 | 5/2006 | Hoyt |
| 7,079,263 B2 | 7/2006 | Sartain |
| 7,085,618 B2 | 8/2006 | Holt |
| 7,370,824 B1 | 5/2008 | Chang |
| 7,508,312 B2 | 3/2009 | Chajec |
| 7,549,814 B1 | 6/2009 | Arrington |
| 7,590,467 B2 | 9/2009 | Holt |
| 7,640,876 B2 | 1/2010 | Memory |
| 7,726,599 B2 | 6/2010 | Lewis |
| 7,774,096 B2 | 8/2010 | Goerg |
| 7,783,380 B2 | 8/2010 | York et al. |
| 7,866,209 B2 | 1/2011 | Tenney |
| 7,954,668 B2 | 6/2011 | Mehus |
| 8,044,844 B2 | 10/2011 | Nyberg |
| 8,160,742 B2 | 4/2012 | Goerg |
| 8,167,004 B2 | 5/2012 | Lee |
| 8,179,528 B2 | 5/2012 | De Vries |
| 8,201,707 B2 | 6/2012 | Ophardt |
| 8,224,480 B2 | 7/2012 | Mok |
| 8,273,504 B2 | 9/2012 | Goia |
| 8,302,473 B2 | 11/2012 | Ramus |
| 8,338,811 B2 | 12/2012 | Lang |
| 8,366,035 B2 | 2/2013 | Kling |
| 8,465,137 B2 | 6/2013 | Fujikawa |
| 8,516,883 B2 | 8/2013 | Studer |
| 8,599,007 B2 | 12/2013 | Larsson |
| 8,690,014 B2 | 4/2014 | Haueter |
| 8,789,787 B2 | 7/2014 | Kling |
| 8,807,475 B2 | 8/2014 | Rodrian |
| 8,833,691 B1 * | 9/2014 | Zosimadis ......... A47K 10/3662 242/563.2 |
| 8,950,254 B2 | 2/2015 | Bernhardsgruetter |
| 9,019,367 B2 | 4/2015 | Hoffmann |
| 9,027,788 B2 | 5/2015 | Ophardt |
| 9,073,028 B2 | 7/2015 | Hovinen |
| 9,113,760 B2 | 8/2015 | Pierquet |
| 9,370,283 B2 | 6/2016 | Fellhoelter |
| 9,524,604 B2 | 12/2016 | Erb |
| 9,791,568 B2 | 10/2017 | Bloomfield et al. |
| 9,944,481 B2 | 4/2018 | Green |
| 10,238,245 B2 * | 3/2019 | Rubenson ............... A47K 10/32 |
| 10,278,550 B2 | 5/2019 | Ophardt et al. |
| 10,506,901 B2 | 12/2019 | Schuh et al. |
| 10,638,891 B2 | 5/2020 | Mogadati et al. |
| 10,660,486 B2 * | 5/2020 | Osborne, Jr. ......... A47K 10/36 |
| 10,929,794 B2 | 2/2021 | Ghazi et al. |
| 11,350,800 B2 * | 6/2022 | Kobs ................. A47K 10/3625 |
| 11,617,478 B2 * | 4/2023 | Murphy ................. A47K 10/38 242/590 |
| 2004/0102870 A1 | 5/2004 | Andersen et al. |
| 2005/0171634 A1 | 8/2005 | York et al. |
| 2005/0258961 A1 | 11/2005 | Kimball et al. |
| 2009/0119142 A1 | 5/2009 | Yenni et al. |
| 2009/0125424 A1 | 5/2009 | Wegelin |
| 2009/0204256 A1 | 8/2009 | Wegelin |
| 2010/0051737 A1 | 3/2010 | Rodrian et al. |
| 2011/0088619 A1 | 4/2011 | Duerrstein |
| 2012/0312853 A1 | 12/2012 | Osborne |
| 2013/0240554 A1 | 9/2013 | Strahlin |
| 2014/0084075 A1 | 3/2014 | Vandelli |
| 2014/0367401 A1 | 12/2014 | Stralin |
| 2015/0034757 A1 | 2/2015 | Bixler et al. |
| 2015/0088570 A1 | 3/2015 | Yenni et al. |
| 2015/0157177 A1 | 6/2015 | Carper |
| 2015/0223646 A1 | 8/2015 | Wegelin |
| 2015/0228181 A1 | 8/2015 | Himmelmann |
| 2015/0253173 A1 | 9/2015 | Cedulf |
| 2015/0274375 A1 | 10/2015 | Kling |
| 2015/0286912 A1 | 10/2015 | Qiyu |
| 2015/0327735 A1 | 11/2015 | Himmelmann |
| 2016/0187484 A1 | 6/2016 | Bloomfield |
| 2016/0262580 A1 | 9/2016 | Fellhoelter |
| 2016/0353946 A1 | 12/2016 | Osborne, Jr. |
| 2016/0364685 A1 | 12/2016 | Wass |
| 2017/0112335 A1 | 4/2017 | Diamond |
| 2017/0254060 A1 | 9/2017 | Hall et al. |
| 2017/0319014 A1 | 11/2017 | Ophardt et al. |
| 2018/0177348 A1 | 6/2018 | Swanson et al. |
| 2018/0263435 A1 | 9/2018 | Osborne, Jr. |
| 2018/0333013 A1 | 11/2018 | Starkey et al. |
| 2018/0368626 A1 | 12/2018 | Williams, Jr. et al. |
| 2018/0368628 A1 * | 12/2018 | Schuh ............... A47K 10/3612 |
| 2019/0028296 A1 | 1/2019 | Yu |
| 2019/0082898 A1 | 3/2019 | Ghazi et al. |
| 2019/0087769 A9 | 3/2019 | Glasgow et al. |
| 2019/0208967 A1 * | 7/2019 | Williams, Jr. ..... A47K 10/3662 |
| 2019/0258997 A1 | 8/2019 | Williams et al. |
| 2019/0308839 A1 | 10/2019 | Schubring et al. |
| 2020/0022540 A1 * | 1/2020 | Mogadati ............... G01B 21/08 |
| 2020/0029752 A1 | 1/2020 | Zimmermann et al. |
| 2020/0323401 A1 | 10/2020 | Keily et al. |
| 2021/0032063 A1 * | 2/2021 | Janek ..................... A47K 10/38 |
| 2022/0095857 A1 | 3/2022 | Tramontina |

FOREIGN PATENT DOCUMENTS

| | | |
|---|---|---|
| CA | 2965971 A1 | 11/2017 |
| CA | 3062633 A1 | 11/2018 |
| CN | 104799748 A | 7/2015 |
| CN | 105193336 A | 12/2015 |
| CN | 107495884 A | 12/2017 |
| CN | 209074404 U | 7/2019 |
| CN | 107684389 B | 10/2020 |
| DE | 202013002398 U1 | 4/2013 |
| JP | 2003038384 A | 2/2003 |
| JP | 2009282879 A | 12/2009 |
| JP | 2011004928 A | 1/2011 |
| KR | 100801577 B1 | 2/2008 |
| KR | 20080004883 U | 10/2008 |
| KR | 101459643 B1 | 11/2014 |
| MX | 2013000012 A | 2/2013 |
| NL | 2016730 B1 | 11/2017 |
| NL | 2017113 B1 | 1/2018 |
| TW | 201635961 A | 10/2016 |
| WO | 2014098672 A1 | 6/2014 |
| WO | 2015066644 A2 | 5/2015 |
| WO | 2015086055 A1 | 6/2015 |
| WO | 2015163802 A1 | 10/2015 |
| WO | 2016041583 A1 | 3/2016 |
| WO | 2016122624 A1 | 8/2016 |
| WO | 2016137450 A1 | 9/2016 |
| WO | WO 2017/040232 * | 3/2017 |
| WO | 2018044276 A1 | 3/2018 |
| WO | 2018213664 A1 | 11/2018 |
| WO | 2019089840 A1 | 5/2019 |
| WO | 2020217887 A1 | 10/2020 |

OTHER PUBLICATIONS

"This Smart Toilet Paper Monitor Tells You When You Need a New Roll;" retrieved Mar. 16, 2020 from https://thenextweb.com/plugged/ 2017 /04/12/toilet paper-automatic-smart-monitor/.

(56) References Cited

OTHER PUBLICATIONS

Datasheet for "Proximity and Ambient Light Sensing (ALS) Module;" VL6180X; Mar. 2016, 87pp.
Hughes; "How Do Time of Flight Sensors (ToF) Work? A Look at ToF 3D Cameras;" May 8, 2019; retrieved Nov. 18, 2020 from https://www.allaboutcircuits.com/technicalarticles/how-do-time-of-flight-sensors-work-pmdtechnologies-tof-3D-camera/.
International Search Report and Written Opinion issued in International Patent Application No. PCT/US20/33944 mailed on Sep. 28, 2020; 16 pp.

* cited by examiner

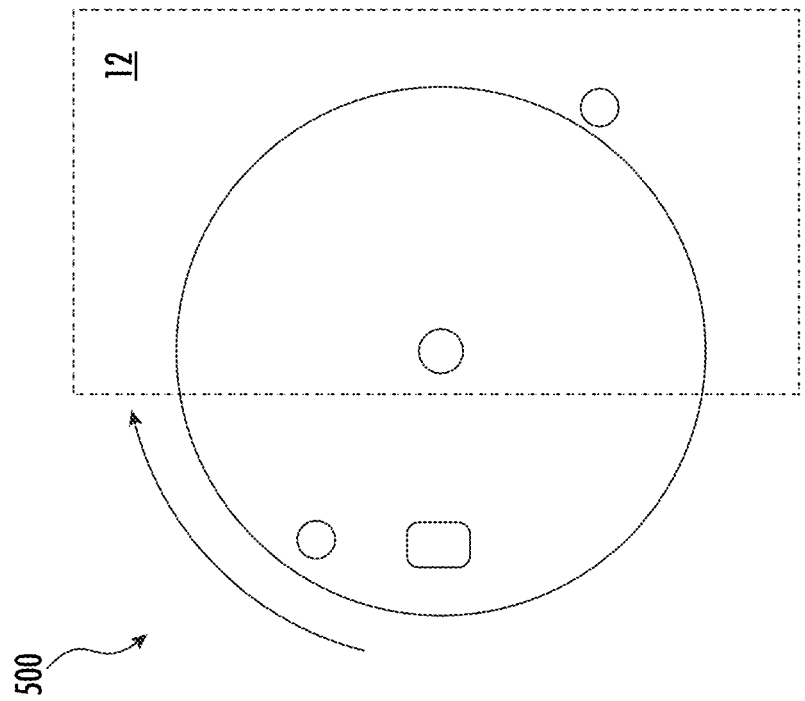
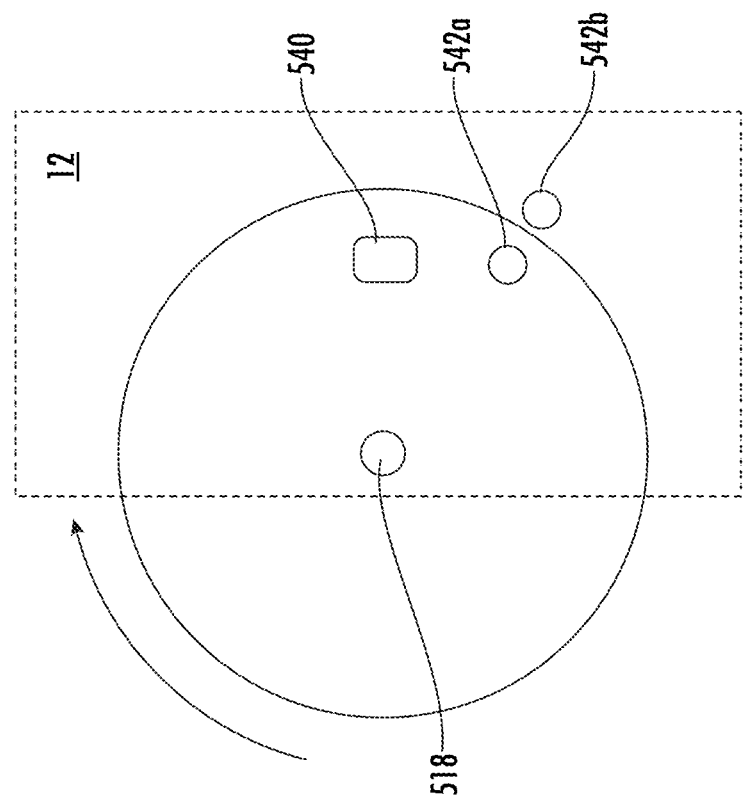

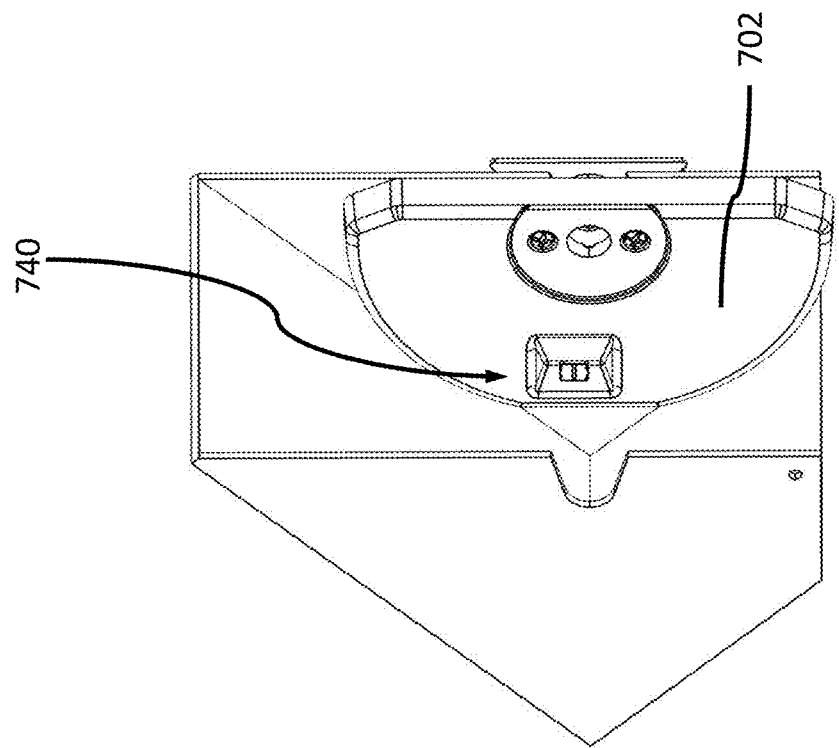
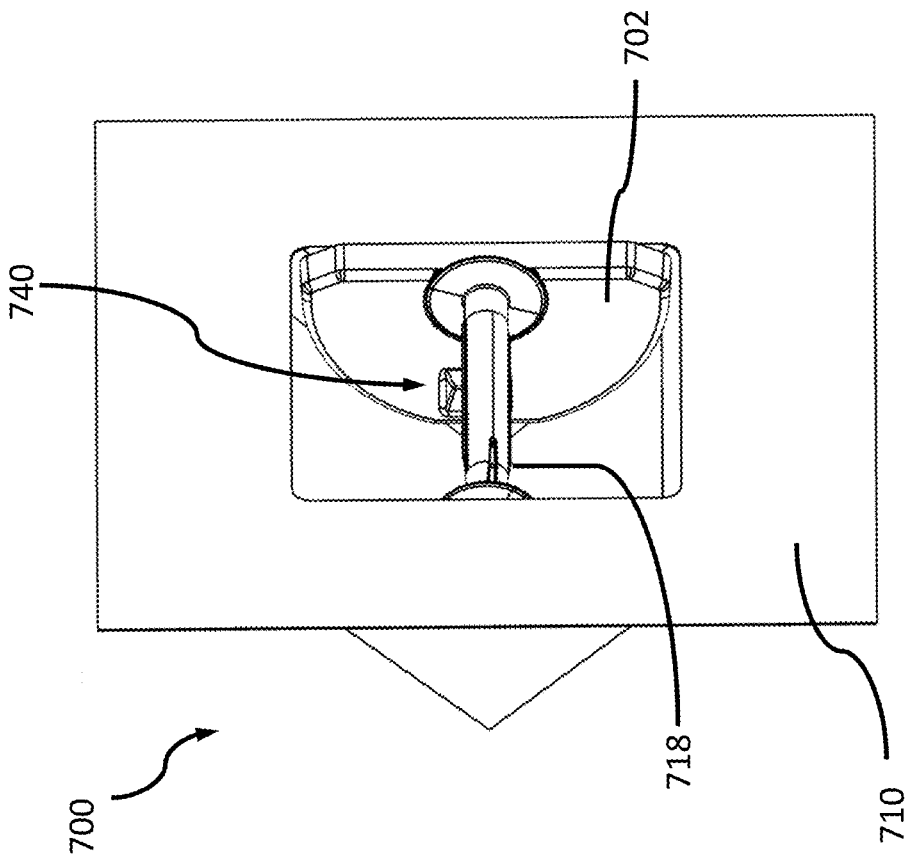
FIG. 7A
FIG. 7B

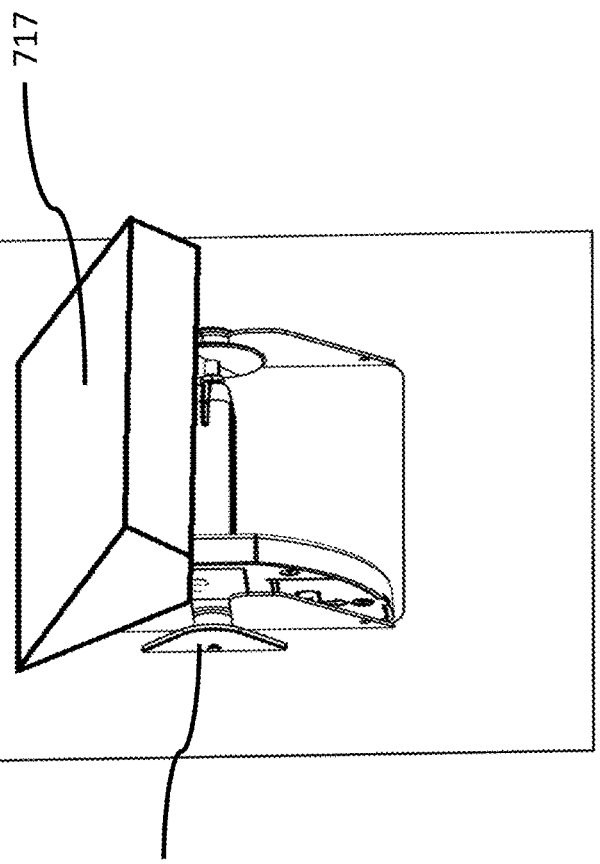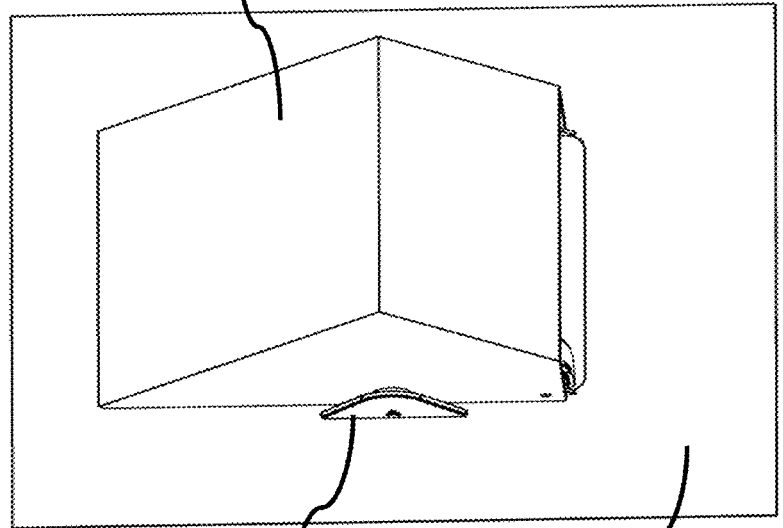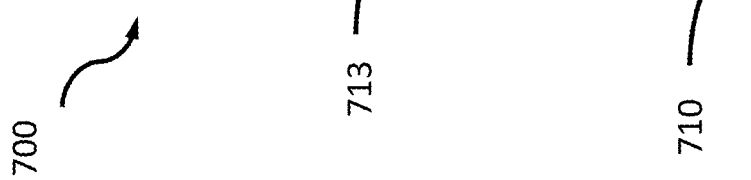
FIG. 7D
FIG. 7C

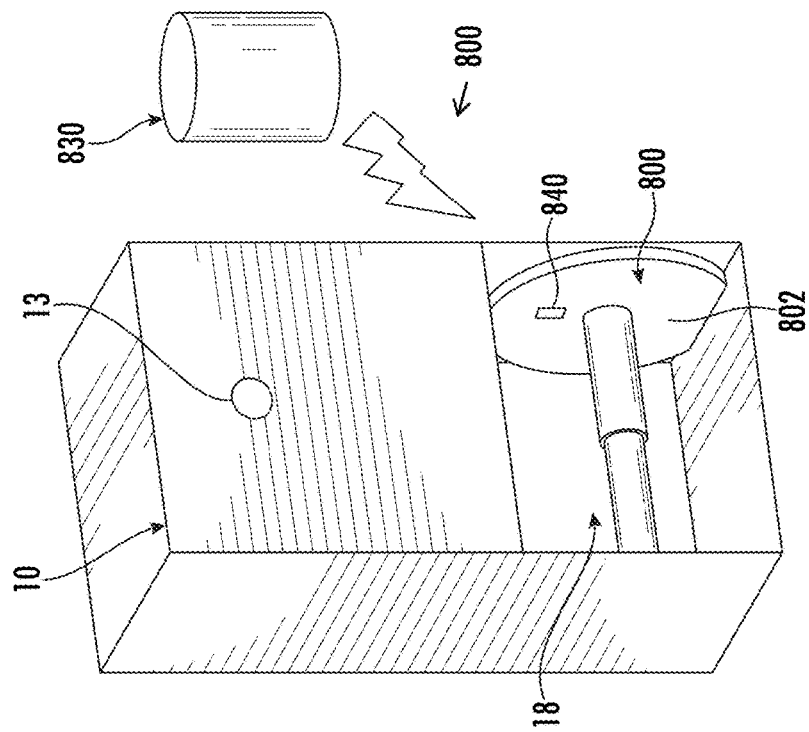
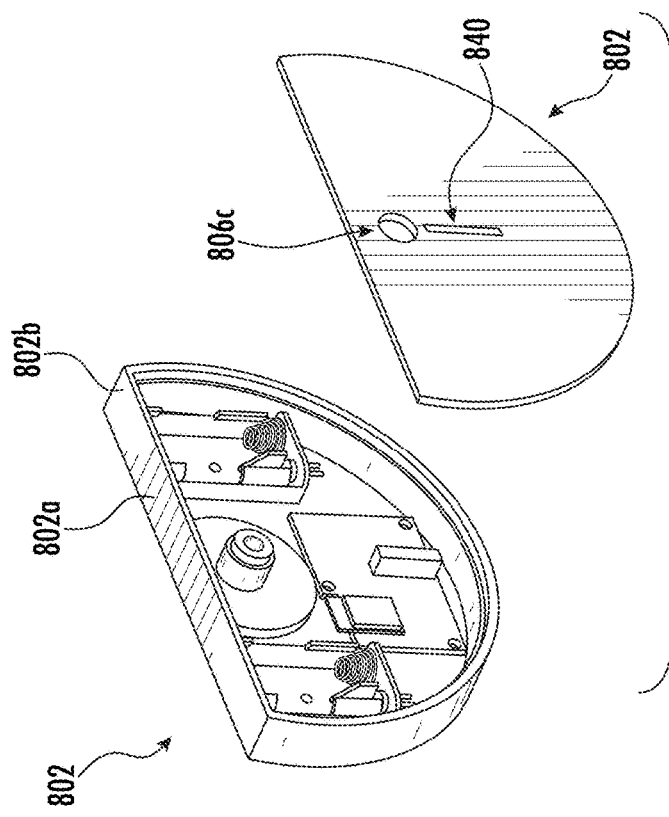
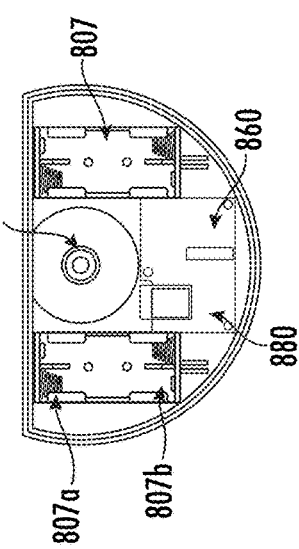

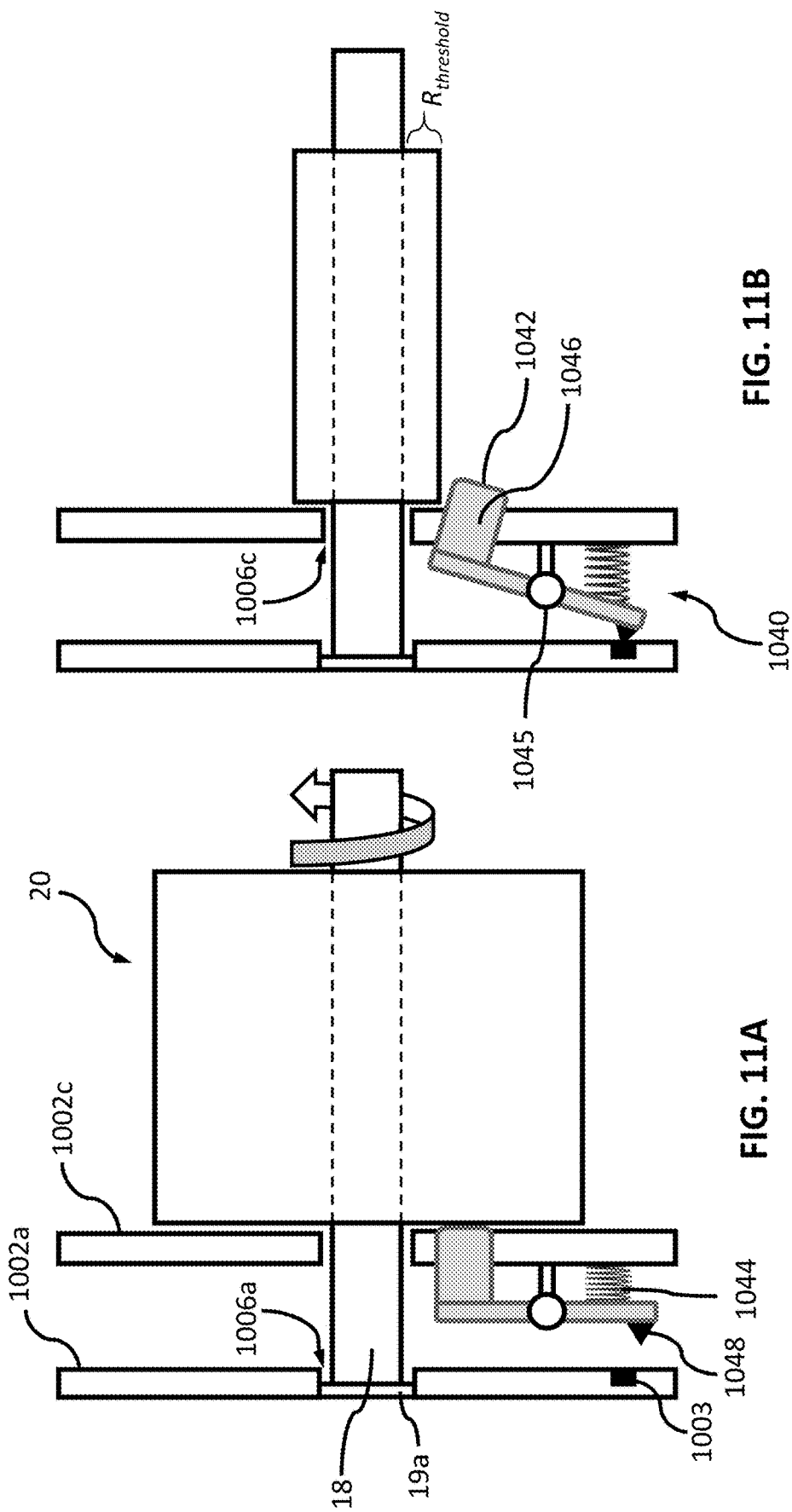

SYSTEMS AND METHODS FOR PRODUCT LEVEL TRACKING OF SHEET PRODUCT ROLLS

CROSS-REFERENCE TO RELATED APPLICATIONS

This application is a continuation of and claims priority to U.S. application Ser. No. 17/065,807, entitled "Systems and Method for Product Level Tracking of Sheet Product Rolls", filed Oct. 8, 2020, which claims priority to U.S. Provisional Application No. 63/039,061, entitled "Systems and Methods for Product Level Tracking of Sheet Product Rolls", filed Jun. 15, 2020, and U.S. Provisional Application No. 62/912,751, entitled "Systems and Methods for Inventory Tracking of Sheet Product Rolls", filed Oct. 9, 2019; each of which is incorporated herein by reference in its entirety.

FIELD OF THE INVENTION

Example embodiments of the present invention generally relate to systems and methods for product level tracking of sheet product on a sheet product roll, and more particularly, for providing, e.g., retrofitting, sheet product dispensers with systems for automatic tracking of the quantity of sheet product remaining on the roll.

BACKGROUND

Conventional sheet product dispensers (e.g., paper towel dispensers and tissue dispensers) provide on-demand sheet product to a user from a supply of sheet product stored within the dispenser, such as in roll form. Rolls of sheet product, however, contain a limited quantity of sheet product such that the dispenser must be inspected regularly to determine whether the quantity of product remaining on a roll is sufficiently depleted such that the roll needs to be replaced. In commercial buildings containing many restrooms, for example, frequently checking the tissue paper dispenser in each stall of each restroom may be a time-consuming process for a maintainer (e.g., a janitor), and further, may result in an unnecessary roll change despite an adequate quantity of tissue paper remaining on the roll at the current time if a new supply would likely be needed prior to the next scheduled inspection. Further, it is difficult to maintain an accurate inventory count, such as for an entire building.

BRIEF SUMMARY

Though various "smart" sheet product dispenser systems have been developed to provide alerts as to the sheet product level and/or remaining inventory, sometimes, the costs associated with removing a conventional sheet product dispenser and replacing with such a "smart" system may be prohibitive. Further, some such "smart" systems require significant battery usage and, thus, may require frequent battery changes. Further, some sensor technology used in various "smart" systems may be improved upon.

Example embodiments of the present invention provide sheet product roll dispensers having sheet product level tracking functionality and systems and methods incorporating the same. For example, some embodiments of the present invention enable sheet product level tracking functionality to be added to a dispenser for dispensing sheet product from a roll without having to remove and/or replace the previously-installed dispenser. In accordance with various aspects, embodiments of the system may include a processor, a product level sensor, and a wireless communications module that are configured to be coupled to a conventional dispenser, for example, such as while the dispenser is mounted on a restroom wall or other structure (e.g., a stall partition). Upon being coupled to a dispenser, a processor associated with the product level sensor may determine, based on signals from the product level sensor, the quantity of sheet product remaining on the roll and, if appropriate, cause the wireless communications module to transmit a message to a remote computing device to indicate that a roll refill is needed. In various embodiments, systems for tracking (and communicating) the quantity of sheet product remaining on a roll may be configured to be powered by one or more batteries, for example, in order to avoid having to plug in or hard wire the dispenser system to an external power source. The product level sensor can have a variety of configurations in accordance with the present teachings. For example, in some embodiments, the systems and methods described herein utilize mechanical product level sensors that require only a limited energy supply, while the processor may restrict wireless transmissions to only certain events (e.g., when the sheet product inventory and/or battery power is low, when the roll has been replaced, etc.) and/or only at certain, pre-defined intervals in an effort to increase battery life. Additionally or alternatively, the systems and methods described herein may utilize a proximity product level sensor for indicating a distance between a portion of the product level sensor and the sheet product on the roll, which can be used to determine the quantity of sheet product remaining on the sheet product roll, for example, as the product level decreases. In various related aspects, the proximity product level sensor may be activated and/or wireless transmissions may be enabled upon the occurrence of only certain events and/or only at certain, pre-defined intervals in an effort to increase battery life.

In various aspects, embodiments of the invention may provide a sheet product roll dispenser having a product level sensor for indicating the quantity of sheet product remaining on a sheet product roll on a spindle extending along a longitudinal axis, wherein the sheet product roll is rotatably mounted within the dispenser. The product level sensor is configured to emit a signal toward an outer circumference of the sheet product roll and to receive a reflected signal therefrom. The product level sensor is positioned a radial distance away from the spindle and aimed to emit the signal in a direction that is not parallel and not perpendicular to the longitudinal axis. The product level sensor detects a parameter of the reflected signal corresponding to the distance between the product level sensor and the sheet product roll (e.g., illuminance, time-of-flight, phase shift). A processor, communicatively coupled to the product level sensor, may be configured to determine the quantity of sheet product remaining on the sheet product roll based on the parameter of the reflected signal. In various example embodiments, the processor may be coupled to the dispenser and the dispenser may further include a wireless communications module that transmits a message to a remote computing device to indicate that a refill is needed, for example, depending on the quantity of sheet product remaining on the sheet product roll as determined by the processor based on the parameter of the reflected signal.

In various additional or alternative aspects, embodiments of the invention may provide a sheet product roll dispenser having a product level sensor configured to generate a signal indicative of the distance to the circumferential perimeter of the sheet product roll from at least a portion of the product level sensor. In various aspects, the product level sensor can comprise an electromagnetic (EMR) source (e.g., a source of visible, IR, UV light, acoustic energy, etc.) directed toward the circumference of the sheet product roll rotatably mounted in the dispenser, with the central axis of the EMR source being neither parallel to the rotational axis of the roll nor perpendicular to the circumference of the sheet product roll, thereby increasing the resolution of the sensor signal as otherwise described herein. Some embodiments may include a wireless communications module that transmits a message to a remote computing device to indicate that a refill is needed, for example, based on the signal indicative of distance as detected by the product level sensor.

Some additional embodiments include apparatuses, systems, and methods including various example embodiments, such as described herein.

In an example embodiment of the present invention a sheet product roll dispenser is provided. The sheet product roll dispenser comprises a housing sized to at least partially contain a sheet product roll. The sheet product roll dispenser includes a spindle coupled to the housing and extending along a longitudinal axis. The spindle is configured to receive the sheet product roll. The sheet product roll dispenser further includes a product level sensor configured to emit a signal toward an outer circumference of the sheet product roll installed on the spindle and to receive a reflected signal therefrom. The product level sensor is positioned a radial distance away from the spindle and aimed to emit the signal in a direction that is not parallel to the longitudinal axis and not perpendicular to the longitudinal axis. The product level sensor detects a parameter of the reflected signal corresponding to the distance between the product level sensor and the sheet product roll. The sheet product roll dispenser further includes a processor configured to determine the quantity of sheet product remaining on the sheet product roll based on the parameter of the reflected signal.

In some embodiments, the sheet product roll dispenser further comprises a communications module configured to transmit product level data to a remote computing device for notifying a user regarding the quantity of sheet product on the sheet product roll, wherein the product level data is indicative of the quantity of sheet product remaining on the sheet product roll. In some embodiments, the notification to the user occurs upon a determination that the quantity of sheet product on the sheet product roll is depleted below a threshold quantity. In some embodiments, a first notification to the user occurs upon a determination that the quantity of sheet product on the sheet product roll is depleted below a first threshold quantity and a second notification to the user occurs upon a second determination that the quantity of sheet product on the sheet product roll is depleted below a second threshold quantity, wherein the first threshold quantity is greater than the second threshold quantity. In some embodiments, the first threshold quantity corresponds to when the reflected signal changes from being reflected off a side surface of the sheet product roll to being reflected off the outer circumference of the sheet product roll. In some embodiments, the processor is configured to determine the quantity of sheet product remaining at intervals, and wherein the duration between the intervals is reduced when the quantity of sheet product roll is below the first threshold quantity. In some embodiments, the duration between the intervals is further reduced when the quantity of sheet product roll is below the second threshold quantity.

In some embodiments, the sheet product roll dispenser further comprises a housing at least partially containing the product level sensor, the communications module, and at least one electrically conductive contact, wherein the housing is configured to be coupled to the sheet product dispenser between an inner surface of the sheet product dispenser and a side of the sheet product roll mounted on the spindle within the sheet product dispenser. In some embodiments, the housing comprises an outer plate, an inner plate, and sidewall extending therebetween, wherein the inner plate comprises one or more optical windows configured to allow the signal to be transmitted and received therethrough.

In some embodiments, the parameter of the reflected signal comprises one of time-of-flight, phase shift, shape, or illuminance.

In some embodiments, the product level sensor comprises an emitter configured to emit the signal such that a central axis of the emitted signal exhibits an angle in a range of about 15 degrees to about 75 degrees relative to the longitudinal axis of the spindle. In some embodiments, the angle is in a range of about 40 degrees to about 50 degrees.

In some embodiments, the processor is configured to limit transmissions initiated by the communications module until the detection of at least one high priority event. In some embodiments, the at least one high priority event is one of an event requiring service at the dispenser and an event of service being provided at the dispenser. In some embodiments, the event requiring service at the dispenser is selected from the group consisting of the processor determining that the quantity of sheet product on the sheet product roll is depleted below a threshold quantity, a charge remaining on one or more batteries coupled to the at least one electrically conductive contact being below a threshold level, and a detection of a fault. In some embodiments, the event of service being provided at the dispenser is selected from the group consisting of the processor determining that the quantity of sheet product on the sheet product roll is refilled above a threshold quantity and the replacement of one or more batteries.

In some embodiments, the processor is configured to limit transmissions initiated by the communications module to pre-defined intervals until the detection of at least one high priority event.

In another example embodiment, a system for providing automatic product level tracking functionality to a sheet product roll dispenser is provided. The system comprises a product level sensor configured to emit a signal toward an outer circumference of a sheet product roll on a spindle extending along a longitudinal axis and to receive a reflected signal therefrom. The sheet product roll is rotatably mounted on the spindle. The product level sensor is positioned a radial distance away from the spindle and aimed to emit the signal in a direction that is not parallel to the longitudinal axis and not perpendicular to the longitudinal axis. The product level sensor detects a parameter of the reflected signal corresponding to the distance between the product level sensor and the sheet product roll. The system further includes a processor configured to determine the quantity of sheet product remaining on the sheet product roll based on the parameter of the reflected signal. The system further includes a communications module configured to transmit product level data to a remote computing device for notifying a user regarding the quantity of sheet product on the sheet product roll. The product level data is indicative of the quantity of sheet product remaining on the sheet product roll. The system further includes an electrically conductive contact configured to be in contact with a terminal of one or more batteries for providing electrical power to at least one of the product level sensor, the processor, and the communications module. The product level sensor, the processor, the communications module, and the at least one electrically conductive contact are configured to be coupled to the sheet product roll dispenser.

In some embodiments, the system is configured to be coupled to the sheet product roll dispenser while the sheet product roll dispenser is installed on one of a wall or a structure such that the sheet product roll dispenser is retrofitted.

In yet another example embodiment, a system for providing automatic product level tracking functionality to a sheet product roll dispenser is provided. The system comprises a housing comprising a product level sensor configured to emit a signal toward an outer circumference of a sheet product roll on a spindle extending along a longitudinal axis and to receive a reflected signal therefrom. The sheet product roll is rotatably installed on the spindle and defines a first side surface, a second side surface, and the outer circumference extending therebetween. The product level sensor is positioned a radial distance away from the spindle and an axial distance away from the first side surface such that the product level sensor is positioned outside of a volume extending between a first plane corresponding to the first side surface and a second plane corresponding to the second side surface. The product level sensor is configured to emit the signal at a non-zero angle with respect to the longitudinal axis. The product level sensor detects a parameter of the reflected signal corresponding to the distance between the product level sensor and the sheet product roll. The housing further includes a processor configured to determine the quantity of sheet product remaining on the sheet product roll based on the parameter of the reflected signal. The housing further includes a communications module configured to transmit product level data to a remote computing device for notifying a user regarding the quantity of sheet product on the sheet product roll, wherein the product level data is indicative of the quantity of sheet product remaining on the sheet product roll. The housing further includes an electrically conductive contact configured to be in contact with a terminal of one or more batteries for providing electrical power to at least one of the product level sensor, the processor, and the communications module. The housing further includes one or more mounting features configured to enable coupling the housing to the sheet product roll dispenser.

In yet another example embodiment, a system for providing product level tracking functionality to a sheet product roll dispenser is provided. The system comprises a product level sensor comprising a source of electromagnetic radiation and a detector for detecting the electromagnetic radiation reflected from a circumference of a sheet product roll rotatably mounted within the dispenser around a spindle extending along a longitudinal axis. The source is configured to emit the electromagnetic radiation toward the sheet product roll along a central axis that is not parallel to the longitudinal axis and not perpendicular to the longitudinal axis. The product level sensor is configured to generate a signal indicative of the distance from at least a portion of the product level sensor to the sheet product roll. The system further includes a processor configured to determine the quantity of sheet product remaining on the sheet product roll based on the signal from the product level sensor. The system further includes a communications module configured to transmit product level data to a remote computing device for notifying a user regarding the quantity of sheet product on the sheet product roll, wherein the product level data is indicative of the quantity of sheet product remaining on the sheet product roll installed on the spindle. The system further includes an electrically conductive contact configured to be in contact with a terminal of one or more batteries for providing electrical power to at least one of the product level sensor, the processor, and the communications module. The product level sensor, the processor, the communications module, and the at least one electrically conductive contact are configured to be coupled to the sheet product roll dispenser.

In yet another example embodiment, a system for adding automatic product level tracking functionality to a sheet product roll dispenser is provided. The system comprises a product level sensor configured to move from a first position to a second position when a quantity of sheet product on a sheet product roll mounted within the sheet product dispenser is depleted below a threshold quantity. The system further includes a processor configured to determine an instance in which the product level sensor moves to the second position. The system further includes a communications module configured to transmit product level data to a remote computing device for notifying a user upon the processor determining that the product level sensor moved to the second position, wherein the product level data is indicative of the quantity of sheet product on the sheet product roll. The system further includes an electrically conductive contact configured to be in contact with a terminal of one or more batteries for providing electrical power to at least one of the product level sensor, the processor, and the communications module. The product level sensor, the processor, the communications module, and the at least one electrically conductive contact are configured to be coupled to the sheet product roll dispenser.

In some embodiments, the system is configured to be coupled to the sheet product roll dispenser while the sheet product roll dispenser is installed on one of a wall or a partition such that the sheet product roll dispenser is retrofitted with the system.

In some embodiments, the product level sensor is biased to be in the second position.

In some embodiments, movement of the product level sensor from the first position to the second position is configured to close a circuit.

In some embodiments, the sheet product roll comprises a central bore extending along a longitudinal axis from a first side to a second side, and wherein at least a portion of the product level sensor is configured to be disposed in contact with the first side of the sheet product roll when in the first position. In some embodiments, the system further comprises a housing at least partially containing the product level sensor, the processor, the communications module, and the at least one electrically conductive contact, wherein the housing is configured to be coupled to the sheet product dispenser between an inner surface of the sheet product dispenser and the first side of the sheet product roll mounted on a spindle within the sheet product dispenser. In some embodiments, the housing comprises an outer plate, an inner plate, and sidewall extending therebetween, the inner plate defining an opening through which at least a portion of the product level sensor extends to be disposed in contact with the first side of the sheet product roll. In some embodiments, each of the inner and outer plate comprises a bore through which the spindle engages a spindle-receiving cavity on the inner surface of the sheet product dispenser. In some embodiments, the housing comprises a spindle receiving cavity for engaging the spindle.

In some embodiments, the product level sensor is a first product level sensor and is mounted so as to contact the first side of the sheet product roll when in the first position at a first radial distance from the central bore, wherein the threshold quantity is a first threshold quantity. The system further includes a second product level sensor that is configured to move from a first position to a second position when a quantity of sheet product on the sheet product roll mounted within the sheet product dispenser is depleted below a second threshold quantity. The second product level sensor is mounted so as to contact the first side of the sheet product roll when in the first position at a second radial distance from the central bore. The second radial distance is smaller than the first radial distance. The second threshold quantity is smaller than the first threshold quantity.

In some embodiments, when the product level sensor is in the first position, the processor is configured to limit transmissions initiated by the communications module until the switch is moved to the second position.

In some embodiments, the processor is configured to limit transmissions initiated by the communications module until the detection of at least one high priority event. In some embodiments, the at least one high priority event is one of an event requiring service at the dispenser and an event of service being provided at the dispenser.

In some embodiments, the processor is configured to limit transmissions initiated by the communications module to pre-defined intervals until the detection of at least one high priority event. In some embodiments, the pre-defined interval is at most about an hour. In some embodiments, the pre-defined interval is at most about 24 hours. In some embodiments, the transmissions by the communications module at the pre-defined intervals comprises product level data and battery state data.

In some embodiments, the processor is configured to determine an instance in which the product level sensor moves from the second position to the first position. The communications module is configured to transmit second product level data to the remote computing device for notifying the user upon the processor determining that the product level sensor moved to the first position.

In yet another example embodiment, an apparatus for adding automatic product level tracking functionality to a sheet product roll dispenser is provided. The apparatus comprises a housing configured to be coupled to the sheet product roll dispenser. The housing at least partially contains a product level sensor configured to move from a first position to a second position when a quantity of sheet product on a sheet product roll mounted within the sheet product dispenser is depleted below a threshold quantity. The housing further includes a processor configured to determine an instance in which the product level sensor moves to the second position. The housing further includes a communications module configured to transmit product level data to a remote computing device for notifying a user upon the processor determining that the product level sensor moved to the second position. The product level data is indicative of the quantity of sheet product on the sheet product roll. The housing further includes an electrically conductive contact configured to be in contact with a terminal of one or more batteries for providing electrical power to the product level sensor, the processor, and the communications module. The housing further includes one or more mounting features configured to enable coupling of the housing to the sheet product dispenser.

In some embodiments, the housing is configured to be coupled, via the one or more mounting features, to the sheet product roll dispenser while the sheet product roll dispenser is installed on one of a wall or a partition such that the sheet product roll dispenser is retrofitted with the housing.

In some embodiments, the one or more mounting features comprises at least one of a mounting bracket, screw holes, or adhesive.

In yet another example embodiment, a system for providing automatic product level tracking functionality for a sheet product roll dispenser is provided. The system comprises a product level sensor configured to move from a first position to a second position when a quantity of sheet product on a sheet product roll mounted within the sheet product dispenser is depleted below a threshold quantity. The system further includes a processor configured to determine an instance in which the product level sensor moves to the second position. The system further includes a communications module configured to transmit product level data to a remote computing device. The product level data is indicative of the quantity of sheet product on the sheet product roll. Transmissions initiated by the communications module are limited to pre-defined time intervals until the detection of a high priority event. The high priority event is selected from a group of events including an instance in which the product level sensor moves to the second position. The system further includes an electrically conductive contact configured to be in contact with a terminal of one or more batteries for providing electrical power to at least one of the product level sensor, the processor, and the communications module. The product level sensor, the processor, the communications module, and the at least one electrically conductive contact are configured to be coupled to the sheet product roll dispenser. The processor is further configured to determine one of occurrence of the high priority event or expiration of a pre-defined time interval and, in response thereto cause transmission of product level data to the remote computing device and cause resetting of a timer for determining expiration of the pre-defined time interval.

In some embodiments, the system further includes the remote computing device, wherein the remote computing device comprises a processor configured to receive, via a remote computing device communications interface, the transmission from the communications module; and notify a user of the remote computing device that the sheet product dispenser is in need of a replacement sheet product roll upon the processor determining that the product level sensor moved to the second position.

In some embodiments, the high priority event is one of an event requiring service at the dispenser and an event of service being provided at the dispenser. In some embodiments, the event requiring service at the dispenser is selected from the group consisting of the product level sensor moving to the second position, a charge remaining on one or more batteries coupled to the at least one electrically conductive contact being below a threshold level, and a detection of a fault. In some embodiments, the event of service being provided at the dispenser is selected from the group consisting of the product level sensor being reset to the first position and the replacement of one or more batteries.

In some embodiments, the pre-defined interval is at most about an hour. In some embodiments, the pre-defined interval is at most about 24 hours.

In yet another example embodiment, a method of tracking product level of a sheet product roll dispenser is provided. The method comprises providing a product level tracking system comprising a product level sensor configured to move from a first position to a second position when a quantity of sheet product on a sheet product roll mounted within the sheet product dispenser is depleted below a threshold quantity. The system further includes a processor configured to determine an instance in which the product level sensor moves to the second position. The system further includes a communications module configured to transmit the product level data, wherein transmissions initiated by the communications module are limited to pre-defined time intervals until the detection of a high priority event. The high priority event is selected from a group of events including an instance in which the product level sensor moves to the second position. The system further includes an electrically conductive contact configured to be in contact with a terminal of one or more batteries for providing electrical power to at least one of the product level sensor, the processor, and the communications module. The product level sensor, the processor, the communications module, and the at least one electrically conductive contact are disposed within a housing coupled to the sheet product roll dispenser. The method further includes determining, via the processor, one of occurrence of a high priority event or expiration of a pre-defined time interval and, in response thereto causing transmission of product level data to a remote computing device, wherein the product level data is indicative of a quantity of sheet product on the sheet product roll coupled to the sheet product dispenser; and causing resetting of a timer for determining expiration of the pre-defined time interval.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 shows an example conventional sheet product dispenser and sheet product roll known in the art;

FIGS. 2A-B shows an example product level tracking system, such as for retrofitting the dispenser of FIG. 1 in accordance with some embodiments discussed herein;

FIG. 3 schematically depicts in additional detail the example product level sensor of FIG. 2A-B, in accordance with some embodiments discussed herein;

FIGS. 4A-C schematically depict use of the example product level sensor of FIG. 2A-B, in accordance with some embodiments discussed herein;

FIG. 5 shows another example product level tracking system in accordance with some embodiments discussed herein;

FIGS. 6A-B schematically depict an orientation sensor, such as for use in the example product level tracking system of FIG. 5, in accordance with some embodiments discussed herein;

FIGS. 7A-D show another example product level tracking system in accordance with some embodiments discussed herein;

FIGS. 8A-C shows an example product level tracking system, such as for retrofitting the dispenser of FIG. 1 in accordance with some embodiments discussed herein;

FIGS. 9A-B schematically depicts in additional detail an example product level sensor, such as for use in the example product level tracking system of FIGS. 8A-C, in accordance with some embodiments discussed herein;

FIG. 10 shows another example product level tracking system in accordance with some embodiments discussed herein;

FIGS. 11A-B schematically depicts in additional detail another example product level sensor, such as for use in the example product level tracking system of FIG. 10, in accordance with some embodiments discussed herein;

FIGS. 12A-B shows another example product level tracking system in accordance with some embodiments discussed herein;

FIGS. 13A-B schematically depicts in additional detail an example product level sensor, such as for use in the example product level tracking system of FIGS. 12A-B, in accordance with some embodiments discussed herein;

FIGS. 14A-B shows another example product level tracking system in accordance with some embodiments discussed herein;

FIG. 15 schematically depicts in additional detail an example product level sensor, such as for use in the example product level tracking system of FIGS. 8A-C, in accordance with some embodiments discussed herein;

DETAILED DESCRIPTION

Figure 1:
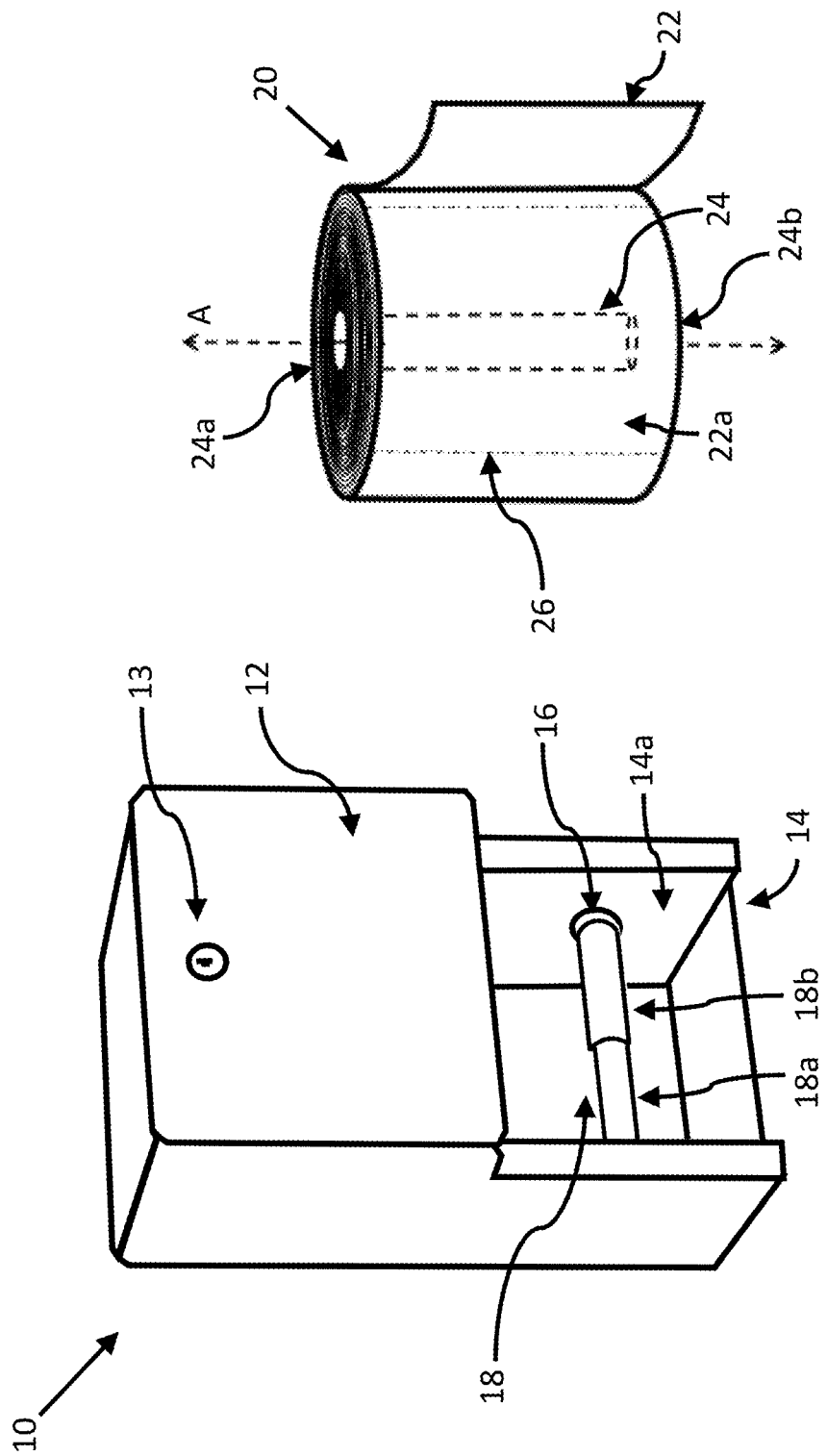

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As used herein, the term "sheet product" may include a product that is relatively thin in comparison to its length and width. Further, the sheet product may define a relatively flat, planar configuration. In some embodiments, the sheet product is flexible or bendable to permit, for example, folding, rolling, stacking, or the like. In this regard, sheet product may, in some cases, be formed into stacks or rolls for use with various embodiments described herein. Some example sheet products include towel, bath tissue, facial tissue, napkin, wipe, wrapping paper, aluminum foil, wax paper, plastic wrap, or other sheet-like products. Sheet products may be made from paper, cloth, non-woven, metallic, polymer or other materials, and in some cases may include multiple layers or plies. In some embodiments, the sheet product (such as in roll or stacked form) may be a continuous sheet that is severable or separable into individual sheets using, for example, a tear bar or cutting blade. Additionally or alternatively, the sheet product may include predefined areas of weakness, such as lines of perforations, that define individual sheets and facilitate separation and/or tearing. In some such embodiments, the lines of perforations may extend along the width of the sheet product to define individual sheets that can be torn off by a user.

As used herein, a "user" of example product dispensers may be a maintainer (e.g., a maintenance person, a janitor, a facility manager, etc.) or a consumer (e.g., a person receiving a dispensed portion of the product).

Example Product Level Tracking Systems

Various types of sheet product dispensers are known in the art. FIG. 1 depicts an example of a conventional sheet product dispenser 10 that is configured to dispense sheet product 22 from a roll 20 that is rotatably supported by the dispenser 10. As shown in FIG. 1, a typical sheet product roll 20 generally includes a sheet product 22 that is wrapped around a central longitudinal axis (A) such that numerous layers of the sheet product are wound around one another. The roll 20 may include a central bore 24 (in phantom) extending along the longitudinal axis (A) between a first side 24a and a second side 24b. Certain rolls of sheet product may be "coreless" (i.e., the central bore 24 of the roll is defined by an inner layer of sheet product 22), while other rolls of sheet product may be "cored" (i.e., the bore 24 is defined by a core of paperboard or other material around which the layers of the sheet product 22 are wound). The sheet product 22 may be a continuous sheet that is severable or separable into individual sheets using, for example, a tear bar or cutting blade. Additionally or alternatively, the sheet product 22 may include predefined areas of weakness, such as lines of perforations 26 as shown in FIG. 1, to facilitate separation and/or tearing. The line of perforations 26 may extend along the entire width or a portion of the width of sheet product 22 to define individual sheets 22a that can be torn off by a user.

The example dispenser 10 includes a dispenser housing 12 defining a compartment 14 within which the roll 20 may be at least partially disposed so as to provide a user access to the sheet product 22. Though only one roll 20 is accessible to the user in the depicted dispenser 10, known dispensers may alternatively provide simultaneous access to a plurality of rolls and may utilize multiple spindles 18 each supporting a different roll of sheet product. For example, certain known dispensers may arrange the rolls on spindles in a side-by-side configuration, a stacked configuration, or a carousel configuration. Additionally, some known dispensers may cover one or more replacement rolls by a housing of the dispenser. The dispenser 10, for example, comprises a storage location within the housing 12, a cover of which may be secured via a lock 13 to prevent unauthorized access to a replacement roll stored therein. In some such dispensers, the dispensers may be configured to cause automatic repositioning of a stored sheet product roll into a dispensing position, such as by utilizing a track or other repositioning feature.

The dispenser housing 12 may be securely installed at a location within the reach of an intended user. For example, a tissue paper dispenser 10 like that of FIG. 1 may be affixed to a surface of a restroom wall or a stall partition (e.g., via adhesive, screws, brackets, etc.) or may be at least partially disposed within a cavity or recess in one of the wall or partition. Some known dispensers, for example, comprise a dispenser housing that is seated or secured within a cutout in a partition between adjacent restroom stalls, with the dispenser housing providing access to a different roll for each stall.

Some sheet product dispensers may be configured to rotatably support the roll 20 so as to allow a user to unwind the sheet product 22 by rotating the roll about its longitudinal axis (A) and then separating the unwound portion from the roll for use. For example, certain sheet product dispensers may utilize a spindle 18 or other type of support that is positioned at least partially within the bore 24 and allows the roll 20 to rotate with respect to the sheet product dispenser. As shown in FIG. 1, for example, an inner surface 14a on each side of the compartment 14 may include an installation feature, such as a hole 16 configured to receive an installation protrusion (not shown) extending outwardly from the ends of the spindle 18. Though various spindles are known in the art for rotatably engaging the dispenser housing 12, the example spindle 18 depicted in FIG. 1 includes two telescoping elongate body portions 18a,b that enable the spindle 18 to be compressed and extended along the spindle's longitudinal axis. After a user mounts a roll 20 on the spindle 18, for example, the user may compress the spindle 18 to enable insertion of the installation protrusions into the corresponding installation holes 16 on the inner surface 14a of the compartment 14. In such aspects, one or more springs disposed within the spindle 18 may be biased such that the telescoping portions 18a,b may extend across the width of the compartment 14 and secure the spindle's installation protrusions within the installation features 16 when the compressive force is released. In this regard, the depicted spindle 18 may be capable of engaging a wide variety of dispensers of varying dimensions (and may be used with product rolls of various lengths).

Some example sheet product dispensers such as that depicted in FIG. 1 may require a user (e.g., a maintainer) to regularly monitor the quantity of sheet product 22 remaining on a roll 20 mounted within the dispenser 10 in order to ensure that the roll does not become empty prior to the next scheduled inspection. If such a situation is likely, the maintainer may replace the roll 20 even if there is sufficient product on the roll for one or more future uses. Accordingly, such frequent inspections and/or premature roll replacements may result in substantially increased maintenance costs. Example embodiments of the present teachings, however, provide sheet product dispensers that provide an automatic notification when a sheet product has a reduced product level and/or is need of replacement, and in some aspects, may enable previously-installed sheet product dispensers to be retrofitted (e.g., without having to remove and/or replace a previously-installed dispenser) with such automatic product level tracking. As discussed in detail below, some example embodiments of the present invention provide a system that may be coupled to an existing sheet product dispenser so as to provide a notification when the dispenser is in need of maintenance and/or a replacement roll.

In accordance with various aspects of the present teachings, the system generally includes a product level sensor, which may indicate when the quantity of sheet product on a roll falls below one or more threshold levels, and a wireless communications module that enables the transmission of such an indication to a remote computing device so as to alert a user regarding the need for a roll refill.

Wherein some example systems in accordance with the present teachings may add such functionality to installed sheet product dispensers lacking a source of electrical power, various example embodiments for coupling to an existing sheet product dispenser may include one or more electrically-conductive contacts for electrically coupling to a battery for powering the automated tracking system. In some embodiments, various systems and methods described herein may provide automated tracking functionality while minimizing maintenance costs (e.g., reducing sheet product waste, decreasing frequency of battery replacement, etc.) by controlling sampling of the product level sensor(s), utilizing one or more mechanical product level sensors, and/or by restricting wireless transmissions to only certain high-priority events (e.g., upon determining that sheet product level and/or battery power is low) and/or only at certain, predefined intervals to confirm continued operation (e.g., once every few hours).

Figure 2A:
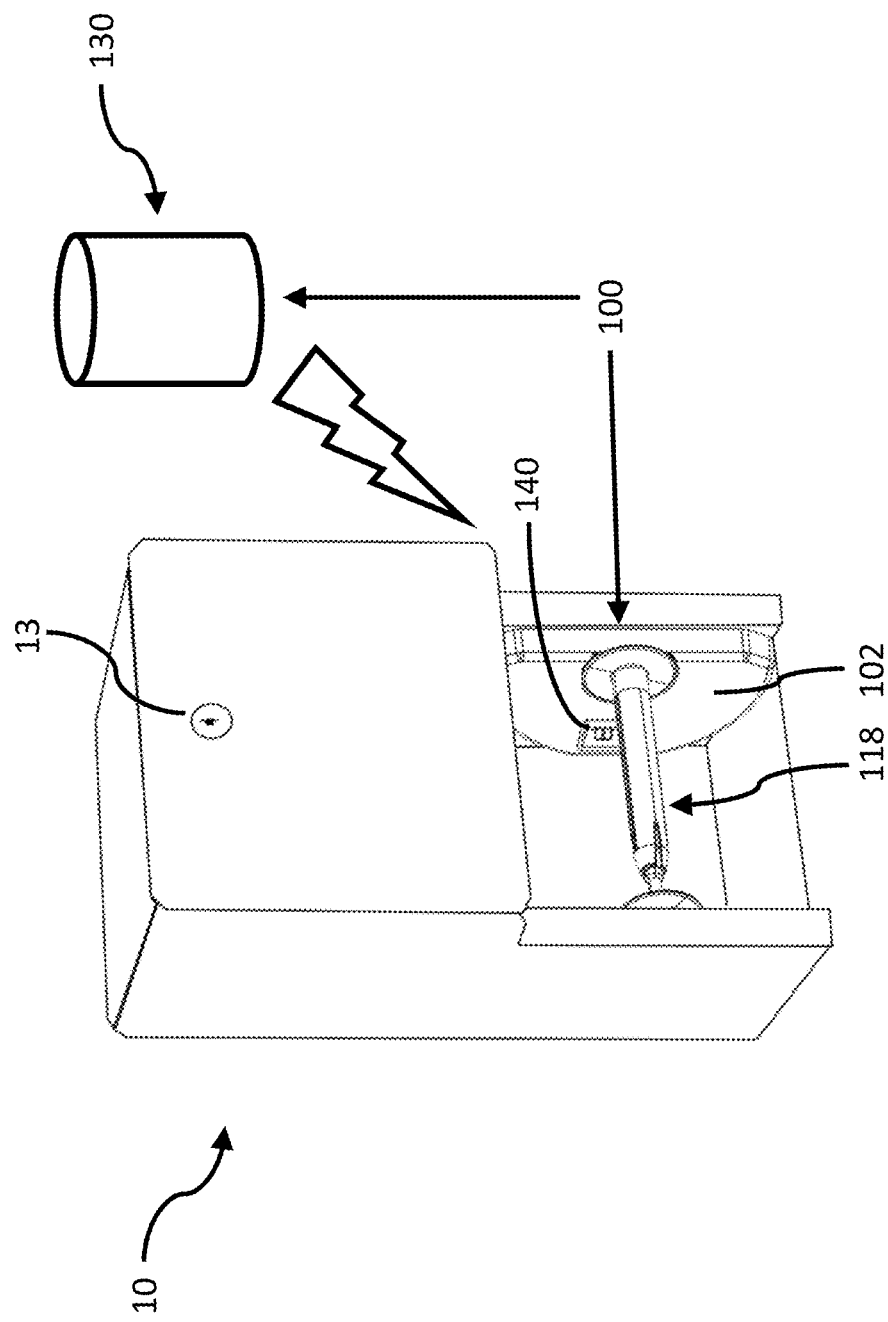
Figure 2B:
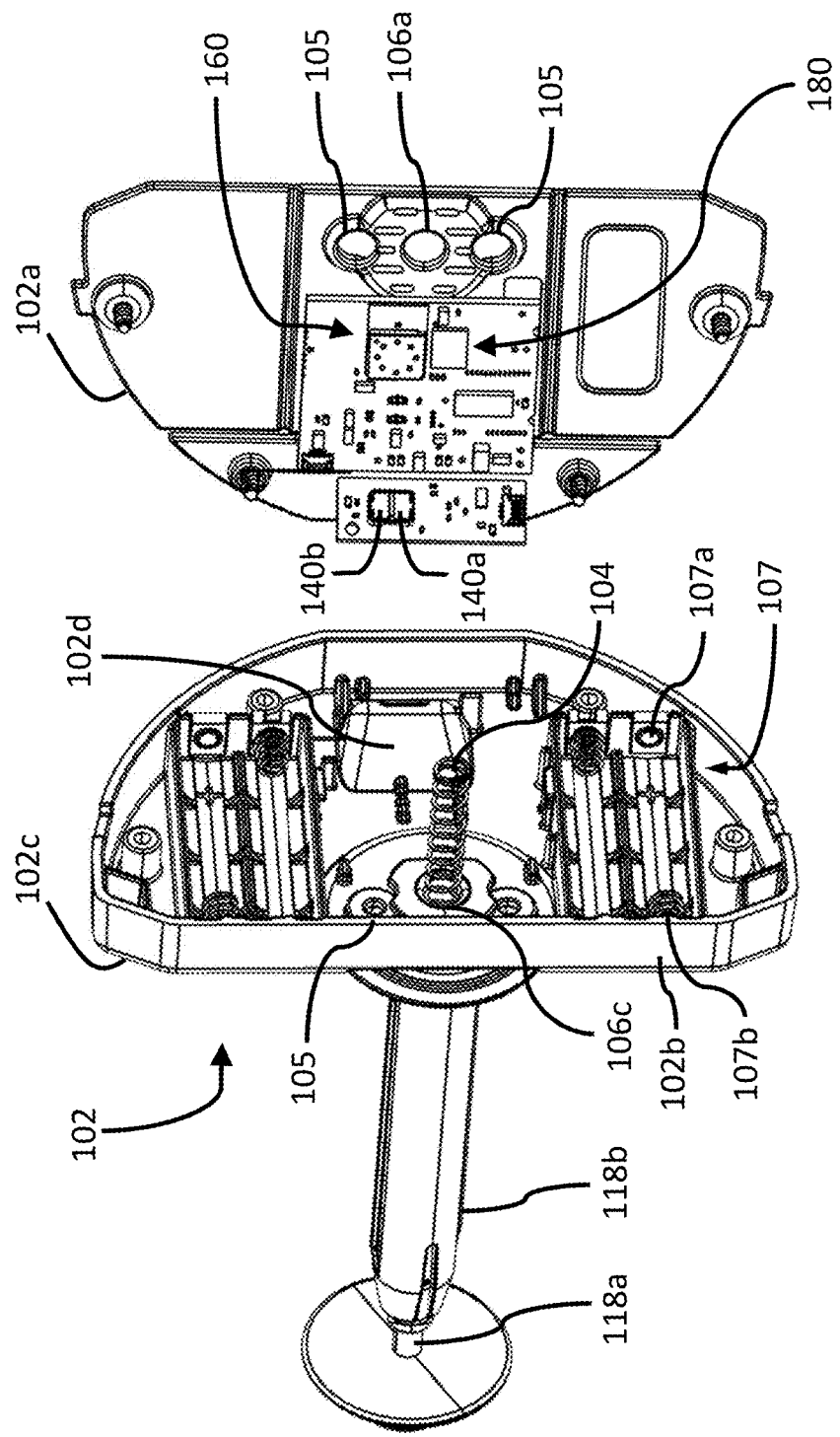

FIGS. 2A-B illustrate an example product level tracking system 100 according to some embodiments of the present invention for enabling automated tracking of sheet product (e.g., tissue paper) remaining on a roll supported by a sheet product (e.g., tissue paper) dispenser 10. As shown, the depicted system 100 may comprise a housing 102 that is configured to be coupled to the dispenser 10 and a remote computing device 130 configured to be in wireless communication with a communications module 180 within the housing 102. It will be noted, however, that while the housing 102 of system 100 is depicted as being coupled to the housing 12 of the previously-installed dispenser 10 of FIG. 1 (e.g., without having to remove and/or replace the dispenser housing 12), the present teachings also provide for standalone dispenser systems that fully replace a conventional dispenser like that of FIG. 1, with one or more of the various features within housing 102 as being integrated within a dispenser housing itself.

With reference first to FIG. 2A, the example housing 102 is configured to be disposed within the dispenser 10 in a location that allows for sensing the sheet product remaining on a roll (as discussed otherwise herein) without restricting rotation of a spindle 118 mounted within the dispenser 10. It will be appreciated in light of the present teachings that the housing 102 may have a variety of shapes and sizes, but in some aspects may generally be shaped and sized to fit within the dispenser 10 to be retrofitted and may be configured to be coupled to the dispenser at a location that does not interfere with the dispensing of sheet product 22 therefrom. For example, in the example embodiment of FIGS. 2A-B, the cross-sectional shape of the housing 102 is in the form of a truncated circle such that the flat portion of the cross-sectional shape can be disposed toward the front of the dispenser 10 and matches the profile of the front of the dispenser 10 when installed so as not to protrude therefrom, thereby reducing potential interference with operation and/ or preventing a user from tampering with various components of the retrofitted system 100.

With reference now to FIG. 2B, the example housing 102 and spindle 118 are depicted in additional detail in partially exploded view. As shown, the housing 102 comprises an inner plate 102c and an outer cover 102a providing a space therebetween within which a product level sensor 140, a processor 160, and/or a communications module 180 may at least partially be disposed. The outer cover 102a may be fixedly coupled to the inner surface 14a of the compartment 14 (e.g., via screws, brackets, adhesive, etc. for mounting the housing 102 to the dispenser 10) such that it does not rotate with the spindle 118 and/or sheet product roll. For example, as shown in FIG. 2B, the inner plate 102c and outer cover 102a comprise holes 105 through which mounting screws can be inserted to secure the housing 102 to the dispenser 10. In some aspects, the outer cover 102a may comprise a protrusion on its outer surface that is configured to be secured within an installation hole 16 of a previously-installed dispenser 10, while a spindle-receiving cavity similar in configuration to the installation feature 16 may be formed in the housing 102 (e.g., in the inner plate 102c and/or cover 102a) so as to receive the installation protrusions from a previously-installed dispenser's spindle 18. However, in the example depicted in FIGS. 2A and 2B, the outer cover 102a comprises a hole 106a through which at least a portion of the spindle 118 may extend for coupling thereto. Likewise, the inner plate 102c comprises a corresponding hole 106c through which at least a portion of the spindle 118 may extend. Thus, as shown, a spring 104 within spindle 118 allows the telescoping elongate body portions 118a,b to be compressed and extended against a surface of the dispenser housing 10 to allow for refill of an empty roll.

As such, a person skilled in the art will appreciate that various aspects of the present teachings enable a wide variety of spindles, including conventional spindles such as spindle 18 from the previously-installed dispenser 10 as well as spindles provided with the housing 102 as otherwise described herein.

Additionally, it will be appreciated that the housing 102 may be configured to exhibit a low-profile so as to be unobtrusively retrofitted into the previously-installed dispenser 10. For example, the depicted housing 102 may comprise a relatively thin sidewall 102b extending from the inner plate 102c such that the compartment defined within the housing 102 is of minimal thickness to contain various components of the inventory tracking system 100 as otherwise discussed herein without obstructing the dispensing of sheet product from the dispenser 10. In some aspects, retrofitting a dispenser 10 may encompass utilizing a replacement spindle (e.g., having a reduced length) and/or a roll 20 having a reduced width to accommodate the housing 102, but preferably, no substantial modifications to the dispenser 10 would be required for coupling of the housing 102 thereto.

In some embodiments, the housing 102 may comprise one or more mounting features that enable secure attachment to the sheet product dispenser 10, such as to the inner surface 14a of the compartment 14 or a track or other repositioning feature. In some embodiments, the housing 102 may be configured with one or more lock features that are configured to lock the cover 102a to the inner plate 102c and/or to the sheet product dispenser (such as to the inner surface 14a). Accordingly, some embodiments may be enabled to prevent unauthorized access to the one or more components (e.g., the product level sensor 140, the processor 160, the communications module 180, batteries, etc.). In some such embodiments, the maintainer may have a key that unlocks the lock features to enable access within the housing 102, such as to replace the batteries.

Finally, though the depicted housing 102 is configured to at least partially contain each of the product level sensor 140, the processor 160, the communications module 180, and a plurality of batteries, these example components need not be contained within a single housing or within a housing at all. Rather, it will be appreciated that components of the product level tracking system 100 that are coupled to the dispenser 10 can be disposed at a variety of one or more distributed locations within the dispenser 10 so as not to interfere with operation thereof. By way of example, one or more components of the tracking system 100 (e.g., electrically conductive contacts for batteries) may be contained within the internal storage location within the housing 12 secured via the lock 13 of the sheet product dispenser 10.

Depending on the configuration of the sheet product dispenser, various types of product level sensors can be used to determine the sheet product remaining on a sheet product roll being dispensed by a dispenser. For example, the product level sensor may comprise a mechanical product level sensor that interacts directly with the sheet product as it is dispensed from the roll. In various embodiments discussed below, example mechanical-based product level sensors may comprise a button, switch, toggle, lever, etc. having at least a portion that may be configured to be disposed in contact with the sheet product and to move as the quantity of sheet product on the roll changes, thereby indicating changes in the quantity of sheet product on the roll. Alternatively, product level sensors suitable for use in accordance with some embodiments of the present teachings may direct a signal, such as an electromagnetic signal (e.g., a beam of visible, IR, or UV light such a from a diode or laser, acoustic energy such as a sound wave), toward the product roll, with a detector being able to detect the reflected signal as the quantity of sheet product on the roll changes, e.g., being reduced below a threshold. Though any of such product level sensors described herein may be utilized in accordance with the present teachings to indicate the quantity of sheet product remaining on a roll, embodiments of systems in accordance with the present teachings may preferably utilize product level sensors that produce signals that enable the determination of the quantity of product remaining on the roll substantially continuously (if desired). For example, whereas some mechanical product level sensors discussed below may exhibit discrete on/off "states" indicating whether the remaining inventory is above or below a particular threshold, the present teachings also provide for automatic product level tracking with product level sensors that may be used to determine the quantity remaining at substantially any point during the lifetime of a sheet product roll. Non-limiting examples of such product level sensors include any mechanical-, optical-, time-of-flight-, ultrasonic-, infrared-, acceleration-, rotation- or weight-based product level sensors known in the art or hereafter developed and modified in accordance with the present teachings. By way of example, a product level sensor in accordance with present teachings may utilize optical, time-of-flight, ultrasonic, or infrared detection by directing an electromagnetic signal toward the product roll 20, with one or more parameters of the reflected signal (e.g., characteristics such as time-of-flight, intensity, illuminance, phase shift, shape of the illuminated area on the sheet product, etc.) being detected to indicate the proximity of a portion of the product level sensor to the sheet product on an installed roll, thereby indicating the quantity of sheet product remaining on the roll.

Alternatively, for example, a weight-based product level sensor may determine remaining inventory based on the weight of the roll, and thus, may indicate a "low inventory" when the weight of a product roll has decreased below a certain value. By way of another non-limiting example, the product level sensor may comprise one or more accelerometers configured to measure the rotation of a spindle such that inventory may be indicated when the number of revolutions has surpassed a certain value since the roll was last filled. In some aspects, the product level sensor may alternatively comprise a mechanical product level sensor that interacts directly with the sheet product as it is dispensed from the roll. For example, in various example embodiments, mechanical-based product level sensors may comprise a button, switch, toggle, lever, etc. having at least a portion that may be configured to be disposed in contact with the sheet product and to move as the quantity of sheet product on the roll changes, thereby indicating changes in the quantity of sheet product on the roll.

Though any of such product level sensors described above and modified in accordance with the present teachings may be utilized, certain example embodiments of systems described herein utilize a proximity product sensor that enables the determination of the quantity of product based on a signal reflected from the circumference of the sheet product at substantially any point during the lifetime of a sheet product roll. With reference again to FIGS. 2A-B, the example product level tracking system 100 includes a time-of-flight product level sensor 140 that is disposed within the housing 102 and utilizes non-contact time-of-flight techniques to determine the distance to the circumference of a roll disposed on the spindle 118. In particular, the example time-of-flight sensor 140 includes a light source 140a and a light detector 140b. The light source 140a is configured to emit light directed at the sheet product 20, from which light reflected off the circumference may be detected by the detector 140b. It will be appreciated by those skilled in the art that time-of-flight sensors suitable for use in accordance with the present teachings can utilize a variety of techniques to indicate the distance from the source 140a to the sheet product roll, for example, using both direct measurements (e.g., the actual time between emission and detection of a light pulse) and indirect measurements. Examples of indirect measurements of time-of-flight include detecting phase shifts in the reflected signal relative to an amplitude-modulated source signal (e.g., using differential voltage measurements of charged capacitors) or detecting the intensity of reflected light over an interval during on/off keying of the source signal (e.g., a square wave).

While a proximity product level sensor 140 in accordance with the present teachings can be disposed at a variety of locations within a dispenser 10 or housing 140, the light source 140a may in some aspects be disposed relative to the roll 20 such that the light source 140a is configured to emit light toward the sheet product roll along a central axis that is neither parallel nor perpendicular to the longitudinal axis of the roll 20 or spindle 18 (e.g., axis (A) of FIG. 1). As shown in FIG. 2B, the inner plate 102c of the housing 102 includes a recess 102d that allows the light source 140a to be angled such that its emission is directed toward the perimeter of the roll without interference from the housing 102 along the light source's "line of sight." Likewise, the detector 140b may also be disposed within the recess 102d to allow reflected light to be reflected from the roll without interference. Though not shown in FIG. 2A or 2B, the light source 140a and detector 140b within housing 100 may be separated by an opaque barrier such that light from the light source 140a cannot be directly transmitted to the detector 140b (e.g., without reflection from the roll). Additionally or alternatively, one or more lenses can be provided to focus light transmitted from the light source 140a or to be received by the detector 140b so as to reduce direct transmission from the light source 140a to the detector 140b and/or to decrease the divergence of emitted light along its central axis (e.g., focus) and/or increase the intensity of reflected light provided to the detector 140b.

As noted above, emission of the light source 140a can be preferably angularly oriented relative to the longitudinal axis of the roll or spindle 118 such that the central axis of emission (whether diverging, converging, or a coherent EMR source) is neither parallel nor perpendicular to the longitudinal axis of the roll or spindle (e.g., axis (A) of FIG. 1). In accordance with the present teachings, a light source disposed in a housing along the side of a roll can be effective to continue to measure the distance to the perimeter of the roll despite its diminishing inventory, while providing an increased resolution of the time-of-flight sensor signal due to the increased distance between the light source and the perimeter of the roll.

Figure 3:
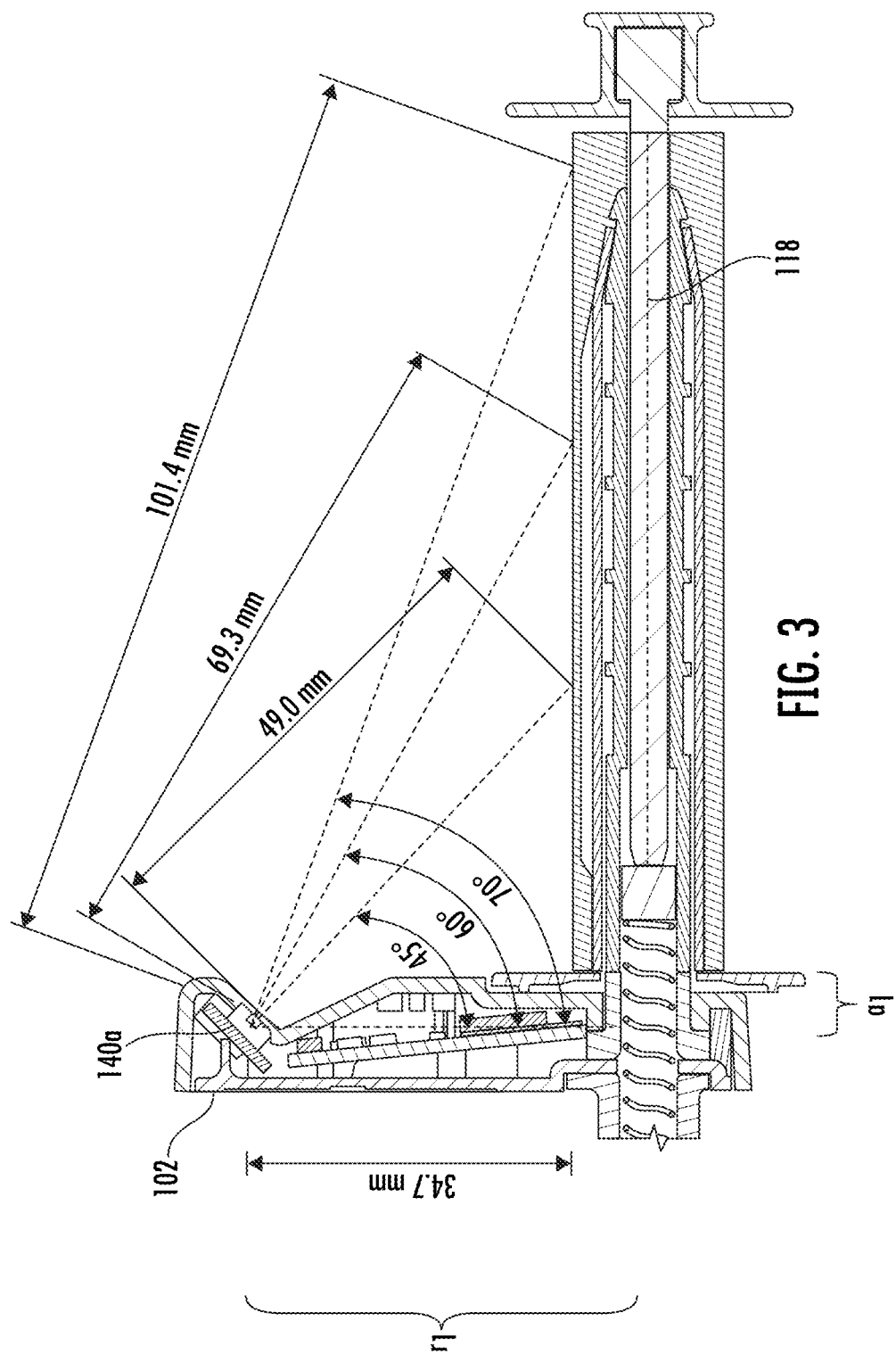

As best shown in FIG. 3, three example central axes are schematically shown for light source 140a at 45 degrees, 60 degrees, and 70 degrees relative to the longitudinal axis of the spindle 118 in accordance with various aspects of the present teachings. The light source 140a is offset from the longitudinal axis of the spindle (e.g., axis (A) of FIG. 1) by a radial distance ($r_1$) and an axial distance ($a_1$) from the left end of a roll (not shown) if mounted on the spindle 118 as shown in FIG. 3. It will be appreciated in light of the depicted geometry (e.g., the radial distance of the light source 140*a* from the spindle 118 (34.7 mm) and distance from the center of the spindle 118 along the longitudinal axis) that a preferred emission angle may be selected in view of the present teachings.

As shown, light transmitted and detected along the 70 degree and 60 degree angle traverse a greater distance than that transmitted and detected at 45 degrees. Notably, the distance traversed at 60 degrees (69.3 mm) is almost twice the distance that would be traveled by reflected light from a light source at the same radial distance from the roll but aimed perpendicular to the longitudinal axis of the spindle 118. A person skilled in the art will therefore appreciate that an angled light source 140*a* in accordance with the present teachings can increase resolution relative to a light source that is aimed perpendicular to the longitudinal axis of the spindle 18 (e.g., the normal of the circumference of the roll).

Moreover, as depicted in the example configuration of FIG. 3, light emitted at an angle of greater than about 75 degrees would not be able to be reflected off the sheet product itself, but would instead be reflected from another portion of the dispenser or spindle 118 and thereby fail to provide any information regarding the remaining inventory except perhaps that it is below a threshold. For example, it will be appreciated that a light source 140*a* that directs its emission substantially parallel to the longitudinal axis of the spindle 118 would act as a "state" threshold in that light would be reflected from the ends of the roll until its inventory was depleted below the central axis of emission. Thus, in accordance with certain aspects of the present teachings, the central axis of the light source 140*a* can exhibit an angle in a range of about 15 degrees to about 75 degrees relative to the longitudinal axis of the spindle 18 (e.g., in a range of about 40 degrees to about 50 degrees, about 45 degrees).

As noted above, various techniques can be used to measure the amount of time it takes for light to be transmitted and reflected, and ultimately, to correlate this duration with a distance to the object. By way of non-limiting example, in a direct measurement of time-of flight, a pulse of light or a sequence of pulses can be used to determine start and stop times for this transmission/detection pair. For example, after a pulse of light is emitted from the light source 140*a* at a first time (e.g., $t_1$), it can be reflected from the surface of the sheet product and received by the light detector 140*b* at a second, subsequent time (e.g., $t_2$). The processor 160, which is contained within the housing 102 and operatively coupled to the product level sensor 140, can determine the time-of-flight (i.e., $t_2-t_1$) for the one or more light pulses to make such a roundtrip to the sheet product. This time-of-flight is inversely related to the inventory of the roll 20 at the time of measurement, where a roll having more inventory would exhibit a shorter time-of-flight relative to the same roll (or a roll of the same style (e.g., same diameter central bore)) having less sheet product remaining.

It will be appreciated by those skilled in the art that the remaining inventory could thus be determined based on this measurement of time-of-flight, for example, by correlating the measured time-of-flight measured with the amount of sheet product remaining (e.g., via a look-up table determined empirically) and/or by calculating the actual distance from the light source 140*a* and light detector 140*b* to the sheet product (e.g., to determine the diameter of the roll), by way of non-limiting example. Distance (d) to the sheet product can be calculated as follows, for example:

$$d = \frac{(t_2 - t_1) * c}{2}$$

where ($t_2-t_1$) is the time-of-flight and c is the speed of light. It will further be appreciated that the distance (d) is related to the diameter of the roll 20, where a roll having more inventory (i.e., a larger diameter) would exhibit a smaller calculated distance (d) relative to the same roll having a smaller inventory (i.e., a smaller diameter). With knowledge of the relative geometry of the light source 140*a*/detector 140*b* and the central bore or spindle 118 (e.g., as exemplified in FIG. 3), the diameter of the roll can thus be calculated from the distance (d) indicated by the time-of-flight product level sensor.

In addition to this direct measurement of time-of-flight (e.g., $t_2-t_1$), a person skilled in the art will appreciate that indirect techniques for determining the proximity of a product level sensor to the sheet product roll may also be utilized in accordance with the present teachings. By way of example, the source 140*a* could be configured to emit an amplitude-modulated source signal (e.g., a source of light), with the detected phase shift in the reflected signal being correlated with the time-of-flight, and thus, distance. For example, using indirect measurements, the distance (d) could be calculated from the detected phase shift as follows:

$$d = \frac{c * \varphi}{4\pi * f}$$

where c is the speed of light, $\varphi$ is the phase angle in radians, and f is the modulation frequency of the source signal. Any other known or hereafter developed technique for determining proximity of the EMR source to the sheet product roll are also within the scope of the present teachings, including the detection of the intensity of the reflected signal during an interval of emission of an amplitude modulated source signal (e.g., on/off keying), by way of non-limiting example. Moreover, proximity product level sensors in accordance with the present teachings may utilize other optical or acoustic techniques to determine the distance to the sheet product roll, which may then be used to determine the quantity of sheet product remaining. By way of example, it will be appreciated that similar calculations to those exemplified above can be used to determine the phase shift of a reflected acoustic signal if the EMR source generates acoustic energy (e.g., at ultrasonic frequencies) directed at the circumference of the sheet product roll.

Additional examples of optical product sensors may comprise a light emitter (e.g., a source of visible, IR, or UV light such as a diode or laser) as the sensor signal source and a light receiver (e.g., a photodetector, photodiode, imaging array, etc.), which in some aspects may be configured to particularly detect the wavelength emitted by the source. In such examples, the emitter and receiver have a field of view that overlap at the distance range measured (e.g., on the perimeter of a roll at diminishing product levels). With the emitter on, reflected light from the circumference of the sheet product roll may return to the receiver to generate a signal (e.g., output voltage) that is proportional to the intensity or illuminance of the reflected light. Because illuminance is inversely proportional to the distance, the signal from the receiver may be utilized to determine distance (e.g., via a lookup table or direct calculation). In accordance with various aspects of the present teachings, an imaging array can alternatively be utilized as the receiver in a proximity product level sensor. In such aspects, the imaging array may be configured to image the shape of the area illuminated by the source on the circumference of the sheet product roll, with the size and/or shape of the illuminated area differing based on the distance of the sheet product roll from the source. As discussed otherwise herein, an angularly-oriented source may be preferable such to allow for increased resolution as the elliptical illuminated area lengthens.

Figure 4A:
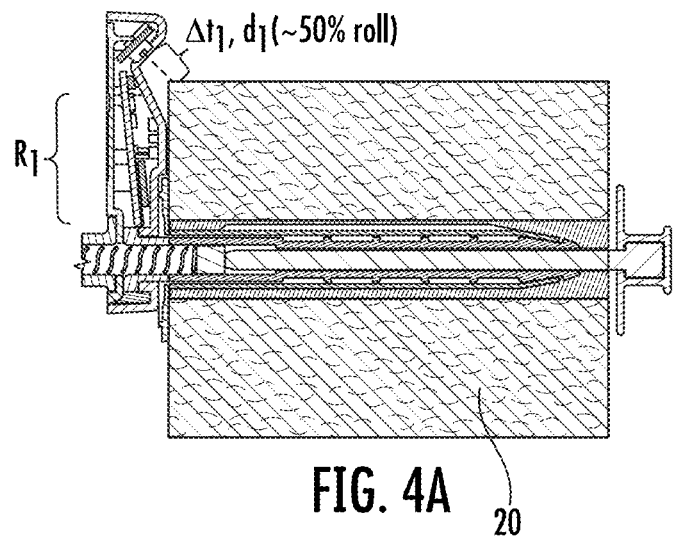
Figure 4B:
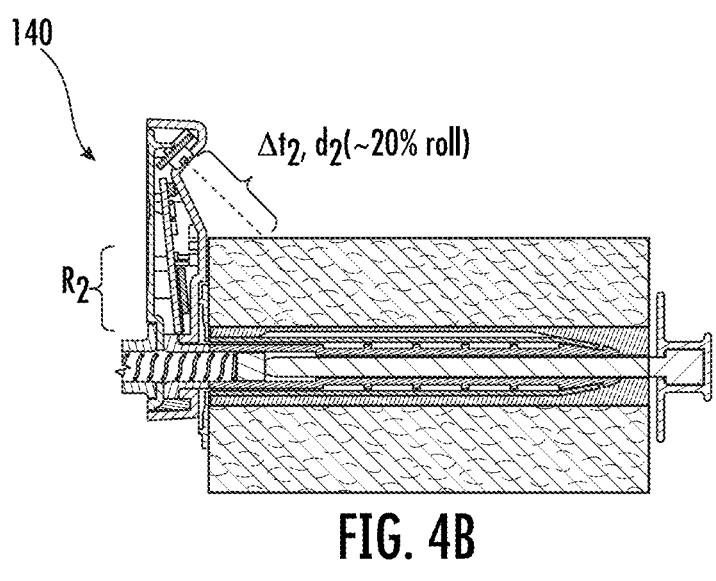
Figure 4C:
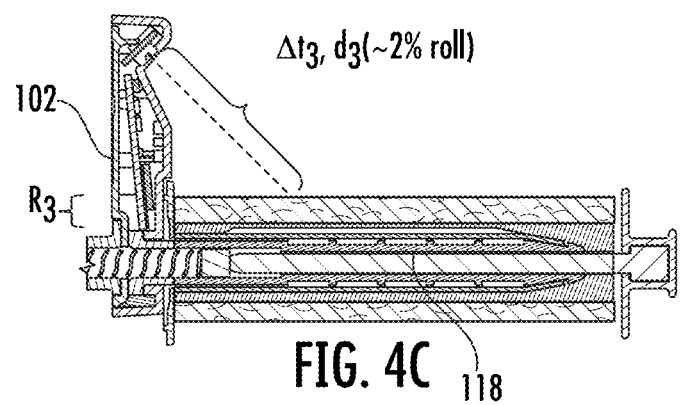

With reference now to FIGS. 4A-C, various rolls 20 of different remaining inventory are shown disposed on the spindle 118, with the product level sensor 140 (including light source 140a and detector 140b) being disposed at a 45 degree angle relative to the longitudinal axis of the spindle 118. As shown in FIG. 4A, the time-of-flight ($\Delta t_1$) and/or distance between the light source and circumference of the product roll ($d_1$) may be determined (e.g., by processor 160) to correspond to a remaining product level of about 50% of a full roll. As schematically depicted in FIGS. 4B and 4C, the time-of flight and/or distance increases as the roll is depleted (i.e., as the diameter of the roll 20 decreases) from 50% to about 20% (FIG. 4B) and to about 2% (FIG. 4C). In the depicted configuration of FIG. 4A, the time-of-flight and/or distance would remain substantially constant after a full replacement roll has been provided until the product level is less than about 50% (FIG. 4A). That is, depending on the size of the roll mounted on the spindle 118, the recess 102d may be partially or fully covered by the roll such that the central axis of the emission from light source 102a would be directed at the end of the roll 20 instead of its perimeter. In such cases, it can be advantageous to limit, if not prevent sampling from the proximity product level sensor 140 until the inventory has been depleted to below the recess 1002. By way of example, the sampling interval may be decreased until the product level has been initially indicated as being less than the recess 102d radial distance. However, a person skilled in the art will appreciate that the housing 102 and product level sensor 140 can be configured in accordance with the present teachings such that the signal source may be directed to the circumference of even a full roll (e.g., by increasing the radial distance of the EMR source 140a). In any event, an initial "threshold" for increased samplings may be utilized in that sampling from the product level sensor 140 may be less frequent until the amount of sheet product remaining is determined to be less than 50% in order to preserve battery life, by way of example. Moreover, it will be appreciated in light of the present teachings that one or more of the example values for remaining sheet product depicted in FIGS. 4A-C could cause a notification to be provided and/or one or more other thresholds may be utilized (e.g., less than 10% remaining sheet product, less than 2%), as discussed in detail below.

With respect to FIGS. 4A-C, it is noted that because of the angled orientation of the product level sensor 140 relative to the longitudinal axis of the spindle 118, the difference between the distance between the light source and the circumference of the roll at various levels of sheet product (e.g., $d_2-d_1$) is greater than the corresponding reduction in the thickness of the sheet product remaining on the roll 20 (e.g., $R_1-R_2$) such that the angled product level sensor 140 may exhibit an increased resolution relative to a product level sensor that is aimed perpendicular to the longitudinal axis of the spindle 118 (i.e., normal to the circumference of the roll 20).

With reference again to FIGS. 2A-B, the processor 160 is operatively coupled to the product level sensor 140 and may be configured to control the transmission of light pulses from the light source 140a and/or to receive a signal from the detector 140b so as to determine the remaining sheet product based on the measurement of the time-of-flight. In various aspects, upon determining that the sheet product level is below a threshold quantity (e.g., below 2% as in FIG. 4C), the processor 160 may be configured to cause the communications module 180 to send information regarding the low remaining sheet product to a remote computing device 130 as otherwise discussed herein. The processor 160 is a suitable electronic device capable of executing inventory tracking functionality via hardware and/or software control. The processor 160 may be, but is not limited to, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

As discussed otherwise herein, the processor 160 may be operably coupled with one or more components of the product level tracking system 100. Such operable coupling may include, but is not limited to, solid-core wiring, twisted pair wiring, coaxial cable, fiber optic cable, mechanical, wireless, radio, and infrared. Processor 160 may be configured to provide one or more operating signals to these components and to receive data from these components. Such communication can occur using a well-known communications protocol such as Bluetooth (e.g., Bluetooth Low Energy (BLE), WiFi, LoRa, Z-wave, Zigbee, cellular, Thread etc.), Inter-Integrated Circuit (I2C), Serial Peripheral Interface (SPI), System Management Bus (SMBus), Transmission Control Protocol/Internet Protocol (TCP/IP), RS-232, ModBus, or any other communications protocol suitable for the purposes disclosed herein.

The processor 160 may include one or more processing units coupled to a memory device, and may optionally be connected to one or more input/output (I/O) controllers or data interface devices (not shown). The memory may be any form of memory such as an EPROM (Erasable Programmable Read Only Memory) chip, a flash memory chip, a disk drive, or the like. As such, the memory may store various data, protocols, instructions, computer program code, operational parameters, etc. In this regard, processor 160 may include operation control methods embodied in application code, typically in the form of software. The software can be encoded in any language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

As noted above, the communications module 180 may be configured to enable direct or indirect communication to an external system (e.g., a remote computing device 130). In this manner, the processor 160 may retrieve data and/or instructions from or transmit data and/or instructions to the remote computing device 130 (e.g., indirectly via a remote, external server) in addition to or as an alternative to the memory within the housing 102, for example.

The communications module 180 can have a variety of configurations, but may generally comprise a transmitter configured to transmit data including product level data to the remote computing device 130 (e.g., a smart hub, the user's mobile device (such as through the software application), a remote server, etc.)), for example, via one or more wireless communication protocols (e.g., WiFi, BLE, LoRa, Z-wave, Zigbee, Thread, cellular, etc.). In some embodiments, the system 100 is configured to receive sensor data from the product level sensor 140 and, through various logic, determine product level data indicative of the quantity of sheet product on the sheet product roll, for example, based on the measured time-of-flight and/or distance to the outer circumference of the sheet product roll. Such product level data can be sent to the remote device 130 (e.g., a smart hub, cloud server, etc.) that uses logic and algorithms to indicate to a maintainer, for example, that a new replacement roll is needed. In some embodiments, the product level data may include data corresponding to the time-of-flight and/or distance, and the remote computing device may utilize such data to determine the quantity of sheet product on the sheet product roll. In general, the term remote computing device comprises one or more computers, computing entities, desktop computers, mobile phones, tablets, phablets, notebooks, laptops, distributed systems, items/devices, servers or server networks, blades, gateways, switches, processing devices, processing entities, set-top boxes, relays, routers, network access points, base stations, the like, and/or any combination of devices or entities adapted to perform the functions, operations, and/or processes described herein.

Electrical energy for one or more components of the product level tracking system 100 may be provided in a variety of manners such as by hard-wiring or plugging the components into an external power source, such as an alternating current ("AC") power source (e.g., a 120V, 60 Hz wall outlet), a solar power source, or any other alternative external power source as may be appropriate for an application. However, in some embodiments, the electrical energy may preferably be provided by one or more batteries (e.g., arranged in series or parallel) that are electrically coupled to one or more of the various components of the product level tracking system 100. For example, as shown in FIG. 2B, the housing 102 of the tracking system 100 may contain a battery compartment 107, within which one or more batteries may be disposed for providing energy to one or more components of the product level tracking system 100 via a pair of electrically-conductive contacts 107a,b in the battery compartment(s) 107. As depicted, the housing of the depicted tracking system 100 includes two battery compartments 107, which together contain four sets of electrical contacts 107a,b for coupling to anodes and cathodes of four "AAA" cell batteries (not shown) in order to energize the product level sensor 140, the processor 160, and the communications module 180, as otherwise discussed herein. It will be appreciated that more or fewer batteries (of different sizes and capacities) may be utilized in tracking systems in accordance with the present teachings based, for example, on the expected energy consumption and space constraints compelled by a previously-installed sheet product dispenser to which the tracking system 100 is to be coupled. Likewise, it will be appreciated that the batteries need not be contained between the inner plate 102c and outer cover 102a as depicted, but may instead be located at another location as long as in electrical contact with one or more components of the tracking system 100 requiring electrical power.

In light of the constraints on the size of batteries that may be disposed within embodiments of housings, such as those configured to retrofit sheet products dispensers in accordance with certain aspects of the present teachings, various embodiments may preferably be configured to conserve the limited electrical supply. By way of example, rather than continuously sample the sheet product level and send transmissions to a mobile computing device, some systems in accordance with the present teachings may limit energy consumption of the various electrical components such as the product level sensor 140, the processor 160, and/or the communications module 180 within the housing 102 of FIGS. 2A and 2B. In some example embodiments of the present invention, the system 100 may be configured to extend battery life by generally operating in a "low power" mode, for example, in which the processor 160 causes the communications module 180 to be in a low or no power state (e.g., off, in standby, asleep) so as to reduce energy consumption by preventing the wireless communications module 180 from transmitting data, attempting to pair (e.g., enter a high power "paired" mode of communication), and/or advertising (e.g., operate in an "advertising" mode of communication) with a remote communication interface (e.g., a hub, router, server, or mobile computing device 130). In some embodiments, unless and until the processor 160 determines that the sheet product remaining on the roll is below a certain threshold, the processor 160 may prevent the communications module 180 from being able to send or receive transmissions. Alternatively, in some example embodiments of a "low power" mode, the processor 160 may prevent the communications module 180 from transmitting data, attempting to pair, and/or advertising with a remote computing device unless and until the processor 160 determines the occurrence of the need for a replacement roll or another "high priority" event.

It will be appreciated in light of the present teachings that the definition of such high priority events can be selected for a particular system depending, for example, on the capacity of the one or more batteries that may be disposed within the housing 102, the minimum desired frequency of battery replacement, and/or the expected frequency of roll changes, etc. In some example embodiments, "high priority" events may be defined to consist of events requiring maintenance such as the product level being depleted below a critically-low threshold (e.g., less than 2% indicating a near-immediate need for a replacement roll), the remaining charge on the batteries being below a threshold level (e.g., below a 10% battery capacity), and/or the occurrence of any other event indicating a need for service of the portion of the system 100 coupled to the dispenser 10 (e.g., detection of a fault). Additionally, in some embodiments, the high priority events may be defined to include an indication that a previously-determined service need has been addressed, for example, when the processor 160 determines that a replacement roll has been provided or upon the system 100 being powered up and that the remaining charge on the batteries is above a threshold level (e.g., above 50% battery capacity, indicating that batteries have been replaced). In such aspects, the example system 100 may thus consume minimal energy unless service is required and/or to provide notification that service has been provided.

In some aspects, the system 100 may also be configured to temporarily exit the "low power" mode in which the communications module 180 is in a low or no power state as discussed above in order to provide an indication to the remote computing device 130 (e.g., to initiate a "heartbeat"). Such an indication, for example, may be that the portion of the system 100 coupled to the dispenser 10 remains operational. By way of example, when the processor 160 has determined that the roll has sufficient sheet product for one or more future uses, the processor 160 may be configured to allow transmissions by the communications module 180 only at pre-defined intervals until a threshold product level is reached. In such aspects, the processor 160 may provide "wake-up" functionality at relatively infrequent intervals to enable the communications module 180 to "advertise" to the remote computing device 130 (or another remote computing device such as a hub, router, server, etc.) that the product level tracking system 100 remains operational. When no immediate service is needed (e.g., in the absence of a high priority event), as detected by the processor 160 during the interval, a relatively short "advertising" transmission (e.g., a beacon) may be utilized in order to conserve battery power. By way of example, the advertising transmission could merely identify the system 100 (e.g., a unique ID associated with the housing 102 in a particular stall), thereby indicating that the local portion of the system 100 remains present and operational. In certain aspects, messages from the communications module 180 in "advertising" mode may additionally comprise product level data (e.g., whether sheet product quantity is above or below one or more thresholds, such as a 50% threshold) and non-product level data such as the occurrence of any faults and/or the remaining charge for batteries contained within the housing 102. In some embodiments, for example, such pre-defined intervals for advertising operability may occur no more than an hour apart, though longer or shorter intervals are also contemplated herein (e.g., no more than 24 hours). Indeed, it will be appreciated in light of the present teachings that in some embodiments, the system 100 need not include an "advertising" mode, depending on the capacity of the one or more batteries that may be disposed within the housing 102 and the desired frequency of battery replacement, for example. Further, although some described embodiments are indicated as being in a "low", "lower", or "no" power mode, such modes may be the normal operating power mode.

For example, with reference to FIGS. 4A-C, when the roll has sufficient sheet product for one or more future uses (e.g., greater than 2% as in FIGS. 4A and 4B), the processor 160 may generally cause the local portion of the system 100 to operate in lower power mode, thereby limiting transmissions initiated by the communications module 180 to only pre-defined "advertising mode" intervals. However, upon the product level sensor 140 indicating that the 2% remaining threshold has been met as in FIG. 4C (or upon the occurrence of another high priority event), the processor 160 may cause the communications module 180 to initiate a pairing (e.g., with a remote wireless communication interface) so as to enable a notification to be provided to the remote computing device 130, indicating the remaining inventory (or other desirable data, such as a low battery capacity in response to a high priority event indicating a low battery). Likewise, in various embodiments, the processor 160 may cause the communications module 180 to send a message comprising product level data upon any occurrence of the sensor 140 indicating that the time-of-flight has decreased to a duration equal to or less than a certain threshold (e.g., $\Delta t_1$ of FIG. 4A), thereby indicating that a new roll has been mounted on the spindle 118.

In addition to or as an alternative to maintaining the communications module 180 in a low or no power state during the low power mode of operation of system 100 as discussed above, the processor 160 itself may be maintained in a relatively low power state, for example, between intermittent determinations of whether there is a need for service. By way of example, rather than determining substantially continuously whether a proximity product level sensor 140 indicates a need for a replacement roll, the processor 160 may be configured to activate the product level sensor 140 at only pre-defined sampling intervals in order to preserve battery life. In order to avoid the roll becoming totally empty, however, it may be preferred that the intervals between samplings is shorter than the intervals between "advertising" messages indicating continued functionality as discussed above. By way of example, the processor 160 may be configured to generally remain in a low power state between samplings of the state of the product level sensor at least once every 15 minutes (e.g., every 10 minutes, every 5 minutes, etc.).

It will also be appreciated in light of the present teachings that the intervals between samplings can also be adjusted based on the determined product level. With reference to FIGS. 4A-C, for example, the processor 160 may cause a first interval between time-of-flight samplings to occur until it is determined that that the roll has been depleted below a first threshold (e.g., ~50% as in FIG. 4A) as it is unlikely that the roll could be depleted within that first interval. However, upon the processor 160 determining that the roll has been depleted below this first threshold, the frequency of sampling by the product level sensor 140 could increase such that the interval is decreased to a second interval that is shorter than the first interval. Likewise, upon the processor 160 determining that the roll has been further depleted below this second threshold (e.g., ~20% as in FIG. 4B), the frequency of sampling by the product level sensor 140 could increase further (or operate substantially continuously) as the roll becomes almost fully depleted.

Additionally or alternatively, the processor 160 may, in some embodiments, be configured to intermittently check the status of charge remaining on the one or more batteries within the housing 102. Though a battery status check may be performed according to the same pre-defined interval, if any, as sampling the product level sensor, pre-defined intervals between checking battery life may also be different (e.g., longer) than intervals between checking whether sheet product inventory has fallen below a threshold. By way of example, because it may be less likely that the one or more batteries within the housing 102 could reach a critically-low level while operating the system 100 in "low power" mode, the processor 160 may be configured to sample the battery charge remaining at less frequent intervals (e.g., once every several hours).

As noted above, the product level sensor can be disposed at a variety of locations within a dispenser or a housing for coupling thereto. For example, in certain aspects the housing 102 may be fixed (e.g., to an inner surface of the dispenser 10) such that the product level sensor 140 is disposed behind the spindle 118 relative to a user (e.g., toward the rear of the dispenser 10) so as to restrict access to the sensor 140 to prevent tampering with the light source 140a or detector 140b as shown in FIG. 2A, for example. While it may additionally be preferable to fix the example housing 102 of FIGS. 2A-B to prevent unauthorized removal of the electronics therewithin, the housing and/or product level sensor may alternatively be configured to rotate along with the sheet product roll and/or spindle according to various aspects of the present teachings.

Figure 5:
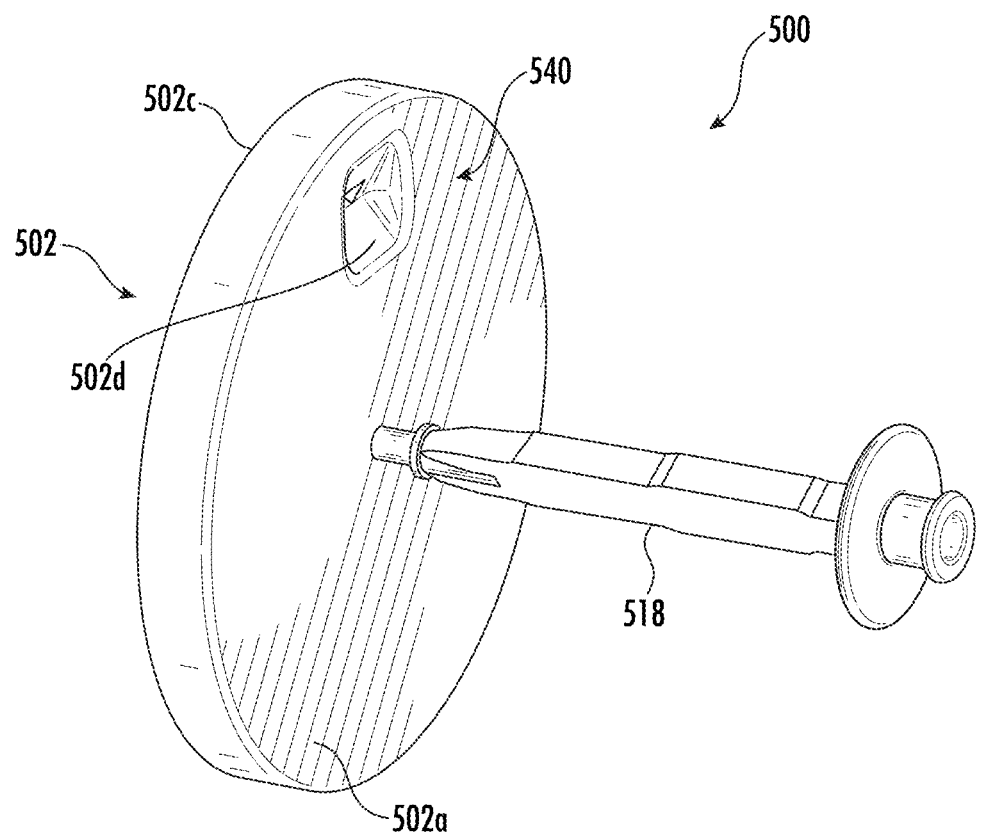

With reference now to FIG. 5, another example product level tracking system 500 according to some embodiments of the present invention is depicted. The system 500 is similar to the system 100 discussed above with reference to FIGS. 2A-B, for example, in that the system 500 also includes a housing 502 containing a proximity product level sensor 540, as well as a processor and a communications module (not shown), the communications module configured to be in wireless communication with a remote computing device as otherwise discussed herein. As noted above, a housing for containing various components of systems in accordance with the present teachings may have a variety of shapes and sizes configured so as to enable coupling to a sheet product dispenser, such as a previously-installed dispenser, without interfering with the operation therewith. For example, whereas in the example embodiment of FIGS. 2A-B, the housing 102 has a flat portion that substantially matches the profile of the front of the dispenser 10, the example housing 502 comprises a substantially circular inner plate 502c and outer cover 502a and inner plate 502c according to differences in the shape and/or size of the dispenser to which the housing 502 is to be coupled. The housing 502 also differs from housing 102 discussed above in that the housing 502 is configured to be coupled to the dispenser 10 such that it may rotate along with a sheet product roll mounted on the spindle 518. By way of example, the outer plate 502a may comprise a protrusion on its outer surface (not shown) that is configured to engage and rotate within the installation features 16 of the dispenser 10.

In addition to providing security features to the housing 502 (e.g., tethers or additional security sensors), it may also be preferable to include one or more additional features to help ensure the accuracy of the proximity measurement during rotation of the product level sensor 540. By way of example, such features in accordance with the present teachings may take into account changes in ambient light as the product level sensor 540 rotates in and out of the dispenser housing by tracking the position of the product level sensor 540 relative to the dispenser 10. Such an ambient light sensor could be located near the detector of the product level sensor 540 such that any detected ambient light could be taken into account by processor when analyzing the signal from the detector. Similarly, a gyroscope or tilt sensor could be provided to determine the orientation of the detector as the housing 502 rotates, with the known orientation being used to adjust the signal from the detector. Alternatively, because many dispensers are metal (or include metal parts), changes in capacitance can be detected by a capacitor sensor mounted near the detector as the capacitor sensor moves into or out of the dispenser.

With reference now to FIGS. 6A-B, an exemplary orientation sensor suitable for use with the system 500 of FIG. 5 is depicted. As shown, a magnet 542b is disposed within the dispenser 12, while an additional sensor 542a capable of sensing the magnetic field generated by the magnet 542b is disposed within the housing 502 of the system 500. Because the relative orientation of the sensor 542b and the product level sensor 540 are known, the position of the product level sensor 540 can be determined and the effect of the ambient light can be taken into account. By way of example, the sensor 542a could indicate that the product level sensor 540 is within the dispenser 12 as in FIG. 6A (low ambient light conditions) or outside of the dispenser 12 as in FIG. 6B (high ambient light conditions). It will be appreciated that though FIGS. 6A-B depict the sensor 542a positioned near the product level sensor 540 as being capable of detecting the position relative to the magnet 542b (e.g., Hall effect sensor), the orientation sensor 542a associated with the rotating housing 502 could instead detect capacitance changes, orientation (e.g., an accelerometer), or even ambient light itself to account for such changes in orientation of the housing 502.

With reference now to FIGS. 7A-D, an example product level tracking system 700 according to some embodiments of the present invention is depicted. As discussed otherwise herein, the system 700 can be incorporated into a newly-installed sheet product dispenser 710 and/or can be retrofitted into a previously installed dispenser to enable automatic tracking functionality to be added thereto. The example product level tracking system 700 is similar to the system of FIGS. 2A-B in that it comprises a housing 702 that can be secured to the inner surface of the dispenser 710 and contains a communications module configured to be in wireless communication with a remote computing device (not shown). As discussed otherwise herein, the housing 702 may include various coupling features (e.g., via screws, brackets, adhesive, etc.) to enable it to be coupled to a newly-installed dispenser 710 and/or retrofitted within the compartment of a previously-installed dispenser, for example. Additionally, the housing 702 may comprise a spindle-receiving cavity so as to secure a spindle thereto.

The system 700 of FIGS. 7A-D also includes a proximity product level sensor 740 and processor (not shown) that may be configured to determine the quantity of product remaining on the roll via non-contact optical or acoustic techniques for determining proximity, for example, based on the distance between the sensor's light source and the circumference of a roll mounted on the spindle 18 as discussed above. As best shown in FIG. 7B (the cover plate and spindle 718 are removed for clarity), the sensor 740 is disposed behind the spindle 718 so as to prevent tampering therewith.

FIGS. 7C-D depict a rear view of the dispenser 710. Retrofitting a previously existing dispenser could be accomplished, for example, by coupling housing 702 thereto, or one could install the entire depicted dispenser 710 within a hole in a wall or a partition, for example. In various aspects, a user of the system 700 could replace a roll or otherwise access the housing 712 or its components by opening the rear cover 717 (e.g., connected via a hinge). Should service of the dispenser 710 be required, a user could remove the dispenser 710 from its installed location and/or open the rear cover 717 to access the components of the housing 702, which can be secured by a lock 713 to prevent unauthorized access.

While the above-described example systems generally utilize proximity product level sensors, product level tracking systems in accordance with various aspects of the present teachings can additionally or alternatively utilize optical-, ultrasonic-, infrared-, acceleration-, rotation-, weight-, and/or mechanical-based product level sensors, etc. to determine product level. For example, in certain embodiments, the product level sensor may comprise a mechanical product level sensor that interacts directly with the sheet product as it is dispensed from the roll in order to reduce the consumption of electrical energy (e.g., to preserve battery life). In various example embodiments, mechanical-based product level sensors may comprise a button, switch, toggle, lever, etc. having at least a portion that may be configured to be disposed in contact with the sheet product and to move as the quantity of sheet product on the roll changes.

FIGS. 8A-C illustrate an example product level tracking system 800 according to some embodiments of the present invention utilizing a mechanical product level sensor 840 for enabling automated tracking of sheet product (e.g., tissue paper) remaining on a roll supported by a sheet product dispenser like that of FIG. 1. As above, the system 800 may comprise a housing 802 configured to be coupled to the dispenser 10 and a remote computing device 830 configured to be in wireless communication with a communications module 880 within the housing 802. With specific reference to FIGS. 8A (shown as an exploded view) and 8B, the housing 802 comprises an outer plate 802a and a cover 802c providing a space therebetween within which a product level sensor 840, a processor 860, and/or a communications module 880 may at least partially be disposed, the housing 802 configured to be disposed within the dispenser 10 in a location that allows for sensing the sheet product remaining on a roll (as discussed in detail below) without restricting rotation of a product roll mounted on the spindle 18. For example, the outer plate 802a may be fixedly coupled to the inner surface 14a of the compartment 14 (e.g., via screws, brackets, adhesive, etc. for mounting the housing 802 to the dispenser 10) such that it does not rotate with the spindle 18 and/or sheet product roll, for example. In some aspects, the outer plate 802a may comprise a protrusion on its outer surface that is configured to be secured within an installation hole 16 of the dispenser 10, while a spindle-receiving cavity similar in configuration to the installation feature 16 may be formed in the housing 802 (e.g., in the outer plate 802a and/or the cover 802c) so as to receive the spindle's installation protrusions. However, in the example depicted in FIGS. 8A-C, the outer plate 802a may comprise a hole 806a that surrounds the dispenser's installation holes 16 and through which at least a portion of the spindle 18 may extend for coupling thereto. Likewise, the inner plate 802c comprises a corresponding hole 806c through which at least a portion of the spindle 18 may extend.

As discussed above with reference to housing 102 of FIGS. 2A-C, the housing 802 may likewise have a variety of shapes and sizes, but may generally be shaped and sized to fit within the dispenser 10 to be retrofitted and may be configured to be coupled to the dispenser at a location that does not interfere with the dispensing of sheet product 22 therefrom. For example, in the example embodiment of FIGS. 8A-C, the cross-sectional shape of the housing 802 is in the form of a truncated circle such that the flat portion of the cross-sectional shape can be disposed downward toward the bottom of the dispenser 10 such that the spindle 18, its installation feature, and/or housing 802 may move within the sheet product dispenser 10 along a track or another auto-repositioning feature to allow a spare roll secured within the dispenser to be accessed. For example, the flat portion may face downward so as to rest on a bottom portion of the track such that the spindle 18 is positioned close to the bottom of the track, thereby allowing the replacement roll to drop down in the track to be accessible by a user (e.g., the track may be designed such that positioning of the spindle 18 at the bottom of the track is necessary to release the replacement roll (e.g., on a second spindle (not shown)) such that it falls into a dispensing position). In addition, in some example embodiments, the cross-sectional shape of the housing 802 can be configured to match the profile of the front of the dispenser 10 when installed (e.g., so as not to protrude therefrom), thereby reducing potential interference with operation and/or preventing a user from tampering with various components of the retrofitted system 800.

Additionally, housing 802 exhibits a low-profile so as to be unobtrusively retrofitted into the previously-installed dispenser 10. For example, as shown in FIGS. 8A-C, the depicted housing 802 comprises a relatively thin sidewall 802b extending from the outer plate 802a such that the compartment defined within the housing 802 is of minimal thickness for containing the various components of the product level tracking system 800 as otherwise discussed herein without obstructing the dispensing of sheet product from the dispenser 10. In some aspects, retrofitting a dispenser 10 may encompass utilizing a replacement spindle 18 (e.g., having a reduced length) and/or a roll 20 having a reduced width to accommodate the housing 802, but preferably, no substantial modifications to the dispenser 10 would be required for coupling of the housing 802 thereto.

In some embodiments, the housing 802 may comprise one or more mounting features that enable secure attachment to the sheet product dispenser 10, such as to the inner surface 14a of the compartment 14 or a track or other repositioning feature. In some embodiments, the housing 802 may be configured with one or more lock features that are configured to lock the outer plate 802a to the inner plate 802c and/or the sheet product dispenser (such as to the inner surface 14a). In such a regard, some embodiments may be enabled to prevent unauthorized access to the one or more components (e.g., the product level sensor 840, the processor 860, the communications module 880, the batteries, etc.). In some such embodiments, the maintainer may have a key that unlocks the lock features to enable access within the housing 802, such as to replace the batteries.

Though the depicted housing 802 is configured to at least partially contain each of the product level sensor 840, the processor 860, the communications module 880, and a plurality of batteries, these example components need not be contained within a single housing or within a housing at all. Rather, components of the product level tracking system 800 that are coupled to the dispenser 10 can be disposed at a variety of one or more distributed locations within the dispenser 10 so as not to interfere with operation thereof. By way of example, electrically conductive contacts for batteries may be contained within the internal storage location within the housing 12 secured via the lock 13 of the sheet product dispenser 10.

As noted above, FIGS. 8A-C illustrate an example product level tracking system 800 utilizing a mechanical product level sensor 840, which comprises a switch configured to extend from the cover 802c into contact with a side of a tissue paper roll mounted on the spindle 18 when the housing 802 of the tracking system 800 is coupled to an inner surface of the dispenser 10. Depending on the quantity of tissue paper on the roll, the switch 840 may be moved between a first position and one or more other positions that is different from the first position. By way of example, the switch 840 may have two states, a first position (state) when a quantity of sheet product is above a threshold for refill and a second position (state) when the quantity of sheet product is depleted below the threshold. In such aspects, the processor 860 may be able to determine the state of the switch 840, for example, based on a change to a product level signal generated by the product level sensor when the switch 840 moves between the first position and second position. Though switch 840 is depicted in FIG. 8C extending from the cover 802c from a location above the spindle 18, it will be appreciated that switch 840 could extend from the housing 802 at various locations around the spindle 18 and be in contact with the sheet product so as to move as the quantity of sheet product on the roll changes as discussed otherwise herein. For example, in certain embodiments, the switch 840 may preferably extend from behind the spindle 18 relative to prevent inadvertent actuation and/or tampering with switch 840.

Figure 9B:
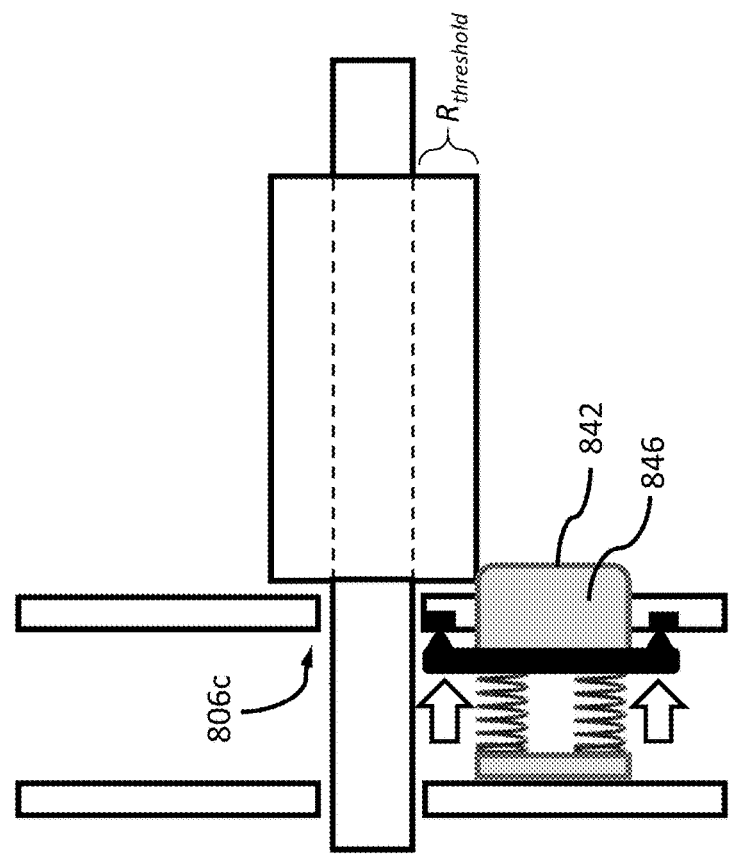
Figure 9A:
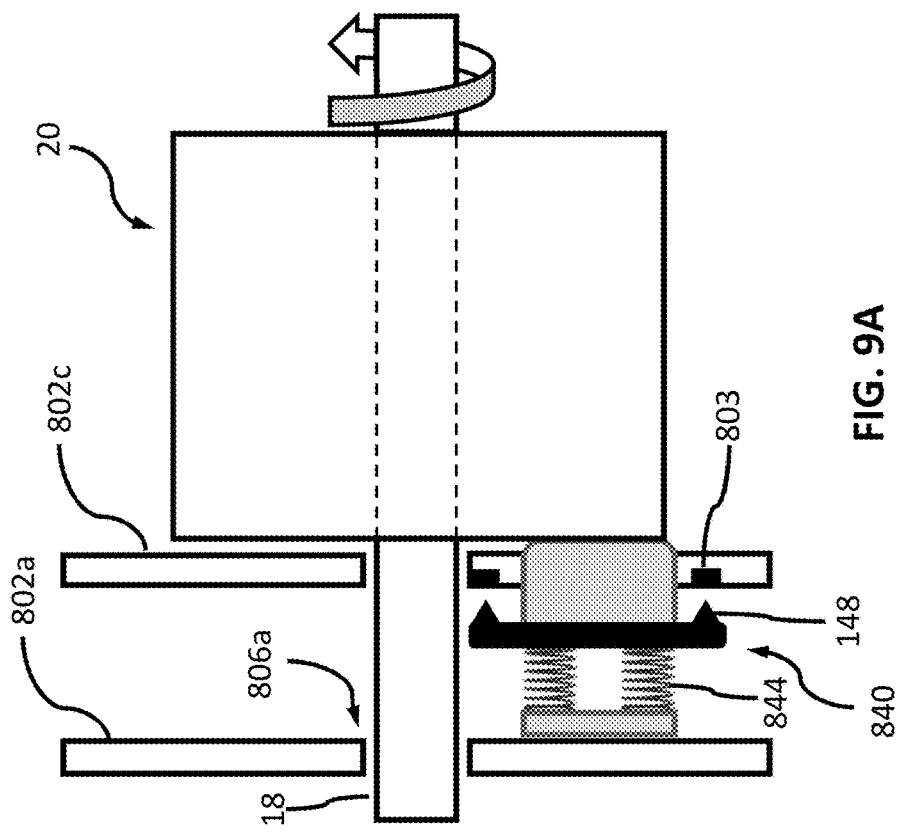

An example switch 840 that may be used with the tracking system of FIGS. 8A-C is shown in additional schematic detail in FIGS. 9A-B. Switch 840 comprises a contact surface 842 configured to be disposed in contact with the side of a roll 20 mounted on a spindle 18 extending through holes 806a,c of the outer and inner plates 802a,c, respectively. Contact surface 842 represents the innermost surface of a body 846 that is biased, such as due to one or more springs 844, to extend from the interior of the housing 802 through the inner plate 802c. As shown in FIG. 9A, when the roll 20 has sufficient sheet product thereon, the contact surface 842 may be in contact with the sides of a plurality of sheets of the sheet product, which is effective to compress the spring(s) 844 from their biased state. However, when the quantity of sheet product remaining on the roll 20 is depleted beyond the threshold ($R_{threshold}$) represented by the inner radial surface of the contact surface 842 as shown in FIG. 9B, the spring(s) 844 extend such that the body 846 moves toward its biased configuration. Electrically-conductive contacts 848 coupled to the body 846 likewise move from the retracted position, until contacting one or more electrodes 803 of the inner plate 802c. By electrically coupling the electrically-conductive contacts 848 to a power source (e.g., a battery within the housing 802) and the electrodes 803 to the processor 860, for example, movement of the contacts 848 into contact with the electrodes 803 may close an electrical circuit therebetween, thereby providing an electrical signal to the processor 860 indicating that the switch 840 has moved from its first position (FIG. 9A) to its second position (FIG. 9B) and signifying that the roll 20 has a remaining inventory of sheet product that is less than the threshold quantity. Notably, while described with respect to the tracking system of FIGS. 8A-C, the example product level sensor 840 may be used with other example product level tracking systems described herein.

With reference again to FIGS. 8A-C, the processor 860, upon receiving the electrical signal from the switch 840 indicating the product level is below the threshold quantity ($R_{threshold}$), may be configured to cause the communications module 880 to send information regarding the low remaining inventory of product to a remote computing device 830 as otherwise discussed herein. Additionally, as discussed in detail above, the communications module 880 may be configured to enable direct or indirect communication to an external system (e.g., a remote computing device 830).

In some embodiments, the system 800 is configured to receive sensor data from the product level sensor 840 and, through various logic, determine product level data indicative of the quantity of sheet product on the sheet product roll, for example, whether the product level sensor 840 in a first position (FIG. 9A) or a second position (FIG. 9B) signifying whether the roll 20 has a remaining inventory of sheet product that is above or below a threshold quantity.

Electrical energy for one or more components of the product level tracking system 800 may be provided in a variety of manners such as by hard-wiring or plugging the components into an external power source, such as an alternating current ("AC") power source (e.g., a 120V, 60 Hz wall outlet), a solar power source, or any other alternative external power source as may be appropriate for an application. However, in some embodiments as shown in FIGS. 8A and 8B, the housing 802 may contain one or more battery compartments 807 having a pair of electrically-conductive contacts 807a,b for electrically coupling to a battery. As depicted, the housing 802 includes two battery compartments 107, which together contain four sets of electrical contacts 807a,b for coupling to anodes and cathodes of four "AAA" cell batteries (not shown) in order to energize one or more of the product level sensor 840, the processor 860, and the communications module 880, as otherwise discussed herein. It will be appreciated that more or fewer batteries (of different sizes and capacities) may be utilized in inventory tracking systems in accordance with the present teachings based, for example, on the expected energy consumption and space constraints compelled by a previously-installed sheet product dispenser to which the inventory tracking system 800 is to be coupled. Further, it will be appreciated that the batteries need not be contained within the housing 802 as depicted, but may instead be located at another location as long as in electrical contact with one or more components of the product level tracking system 800 requiring electrical power.

Figure 10:
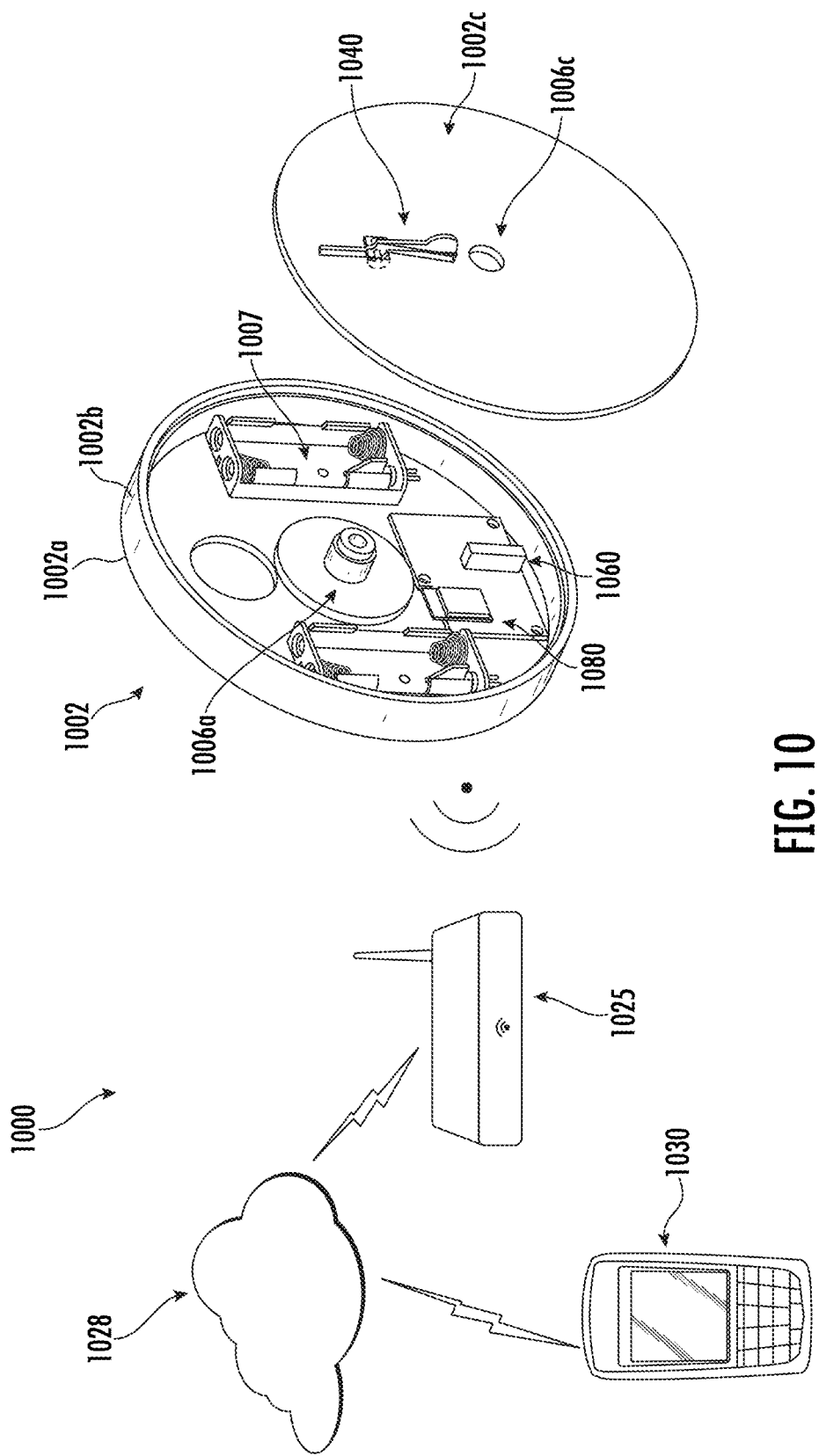

With reference now to FIG. 10, another example product level tracking system 1000 according to some embodiments of the present invention is depicted. The system 1000 is similar to the system 800 discussed above with reference to FIG. 8A, for example, in that the system 1000 also includes a housing 1002 containing a product level sensor 1040, a processor 1060, and a communications module 1080, the communications module 1020 configured to be in wireless communication with a remote computing device 1030. As noted above, a housing for containing various components of systems in accordance with the present teachings may have a variety of shapes and sizes configured so as to enable coupling to a sheet product dispenser, such as a previously-installed dispenser, without interfering with the operation therewith. For example, whereas in the example embodiment of FIGS. 8A-C, the housing 802 has a flat portion that substantially matches the profile of the bottom of the dispenser 10, the example housing 1002 comprises a substantially circular outer plate 1002a and inner plate 1002c according to differences in the shape and/or size of the dispenser to which the housing 1002 is to be coupled. The housing 1002 also differs from housing 802 discussed above in that the outer surface of the outer plate 1002a may be configured to fixedly engage the installation holes 16 of the dispenser 10. By way of example, the outer plate 1002a may comprise a protrusion on its outer surface (not shown) that is configured to be at least partially secured within the installation features 16, while the inner surface of the outer plate 1002a may comprise a spindle-receiving cavity 1006a for rotatably coupling to installation protrusions of a spindle 18 extending through the hole 1006c in the inner plate 1002c.

As shown in FIG. 10, the wireless communications module 1080 is also configured to be indirectly coupled to a remote computing device 1030 (e.g., a remote server, a base station, the maintainer's mobile phone, etc.), which receives a notification of when the product level becomes depleted such that a replacement role is (or is soon to be) required, for example. By way of example, in the exemplary system of FIG. 10, the communications module 480 may transmit product level data to a router or smart hub 1025 via utilizing a WiFi (or other short range wireless protocol), which can transmit the data to a cloud server 1028 (e.g., via the Internet), which can provide a notification to the user of the mobile phone 1030 (e.g., via the Internet or a cellular network).

An example product level sensor 1040, such as for use with the product level tracking system of FIG. 10 is depicted in additional schematic detail in FIGS. 11A-B. As shown, product level sensor 1040 comprises a lever 1046 that is configured to rotate about pivot 1045. The lever 1046 comprises a contact surface 1042 configured to be disposed in contact with the side of a roll 20 mounted on a spindle 18 extending through holes 1006c of the inner plates 1002c, with the spindle installation protrusions 19a being retained within the spindle receiving-cavity 1006a of the outer plate 1002a. In its biased state and when the quantity of sheet product is below a threshold quantity ($R_{threshold}$) as shown in FIG. 11B, the contact surface 1042 of the lever 1046 is configured to extend outwardly away from the inner plate 1002c. When a new roll has been mounted on a spindle or when sufficient sheet product remains thereon, however, the sheet product exerts a force on the contact surface 1042 such that the lever 1046 maintains the position shown in FIG. 11A in which an electrically-conductive contact 1048 is not in contact with an electrode 1003 of the inner plate 1002a. By electrically coupling the electrode 1003 to a power source (e.g., a battery within the housing 1002) and the electrically-conductive contact 1048 to the processor 1060, for example, a circuit may be opened or closed depending on whether the quantity of product on the roll is above or below the threshold at which a need for replacement is indicated. Notably, while described with respect to the product level tracking system of FIG. 10, the example product level sensor 1040 may be used with other example tracking systems described herein.

Figure 12B:
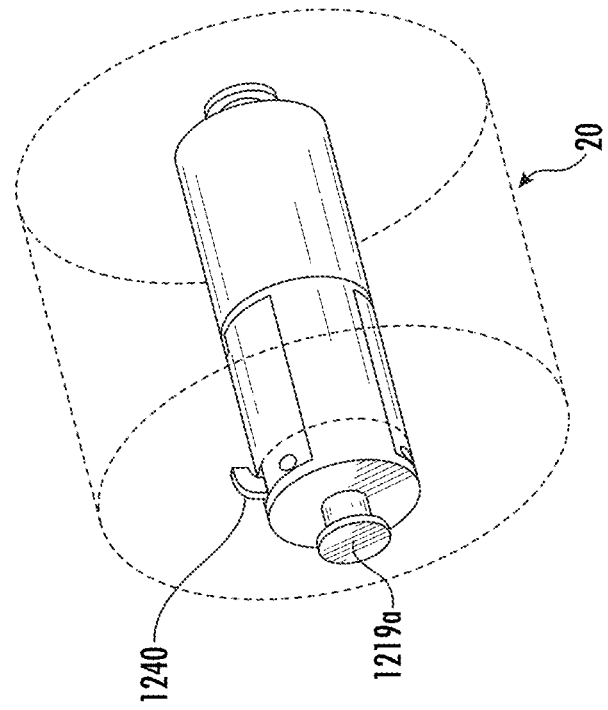
Figure 12A:
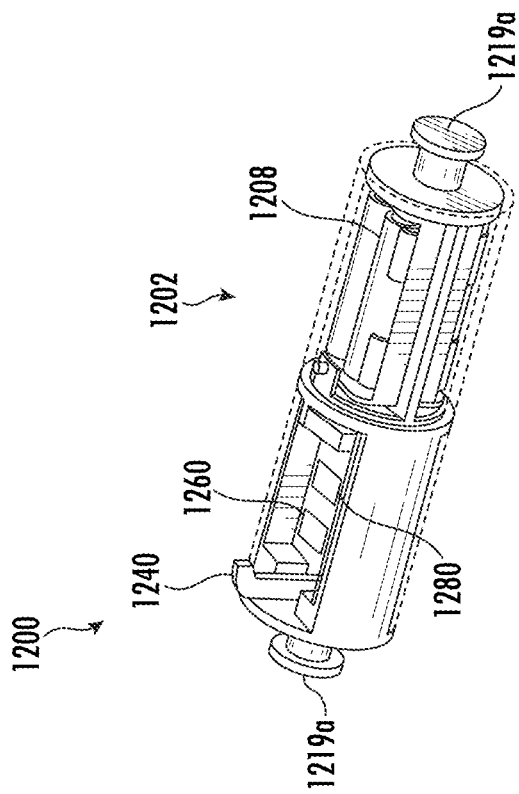

With reference now to FIGS. 12A-B, another example product level tracking system 1200 according to some embodiments of the present invention is depicted. The system 1200 is similar to the systems discussed above, for example, in that the system 1200 comprises a housing 1202 configured to at least partially contain a product level sensor 1240, a processor 1260, a communications module 1280, and one or more batteries 1208 (which can provide power to components within the housing via an electrical contact) and can be coupled to a sheet product dispenser, such as a previously-installed sheet product dispenser 10. However, whereas the housing 802 of the system 100 of FIG. 8 and the housing 1002 of the system 1000 of FIG. 10 are configured to be fixedly coupled to the dispenser such that they do not rotate upon rotation of the spindle and/or roll, the housing 1202 is configured to be disposed within a bore of the roll of sheet product as shown in FIG. 12B such that the housing 1202 rotates therewith. In particular, the elongate housing 1202 may comprise one or more compartments such that one or more of the product level sensor 1240, the processor 1260, the communications module 1280, and the one or more batteries 1208 may at least partially be disposed within the bore upon mounting a product roll 20 on the housing. Moreover, each end of the housing 1202 may comprise installation protrusions 1219a that are configured to extend into installation features 16 of the dispenser 10, for example. In various embodiments, the housing 1202 may be extendable from a first retracted configuration having a reduced length to a second extended configuration to allow the housing to be secured within an installation feature 16 of the dispenser 10. By way of example, a spring (not shown) within one or both of the protrusions 1219a may bias a telescoping portion of the protrusions 1219a outward to allow the housing 1202 to be extended and compressed along its longitudinal axis.

Figures 13A, 13B:
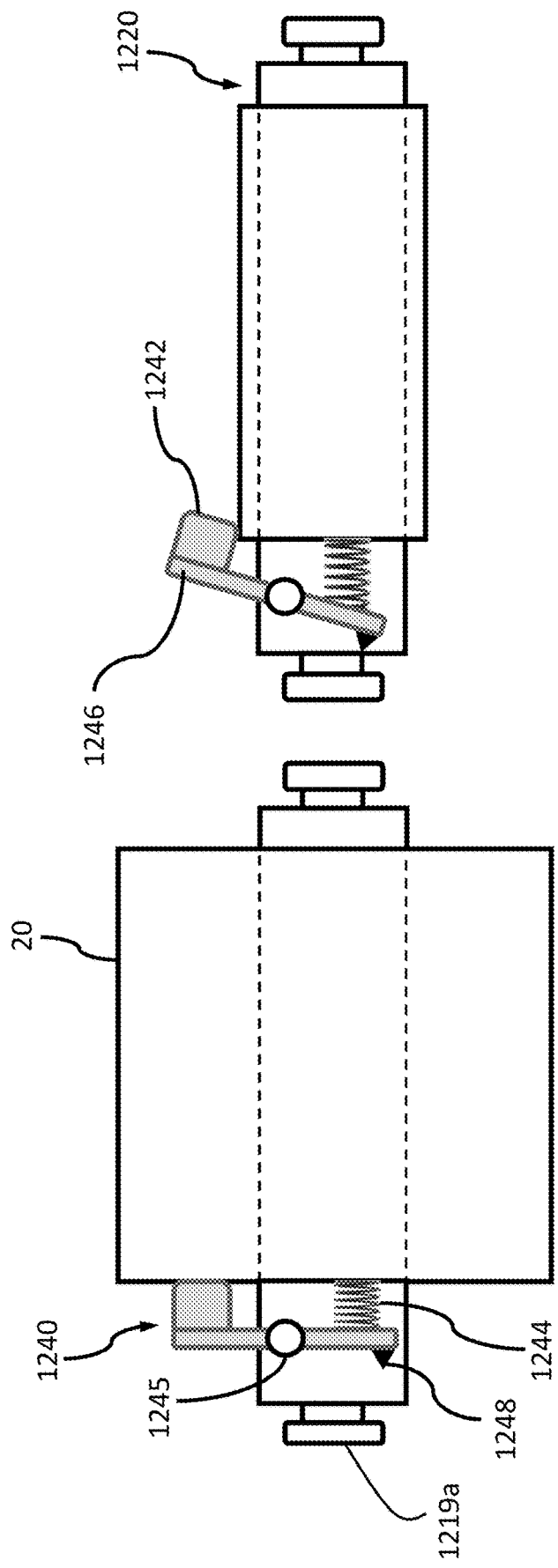

An example product level sensor 1240, such as for use with the product level tracking system of FIGS. 12A-B, is depicted in additional schematic detail in FIGS. 13A-B. Product level sensor 1240 is similar to product level sensor 1040 of FIG. 10, but differs in that the lever 1246 extends through a circumferential wall of the housing 1202 and is configured to rotate with the roll 20. Nonetheless, the lever 1246 likewise comprises a contact surface 1242 configured to be disposed in contact with the side of a roll 20 mounted on the housing 1202. The lever 1246 is configured to be biased in the position of FIG. 13B (e.g., due to the force of one of more springs 1244). However, when a new roll has been mounted on the housing 1202 or when sheet product above a threshold quantity remains thereon, the roll is configured to rotate the lever 1246 about the pivot 1245 to the position of FIG. 13A in which an electrically-conductive contact 1248 is not in contact with an electrode (not shown). When the quantity of sheet product is below a threshold quantity ($R_{threshold}$) as shown in FIG. 13B, the lever 1246 may rotate about pivot 1245 such that the electrically-conductive contact 1248 may close a circuit, for example, thereby indicating to the processor 1260 that a replacement roll is needed. Notably, while described with respect to the product level tracking system of FIGS. 12A-B, the example product level sensor 1240 may be used with other example tracking systems described herein.

Figure 14B:
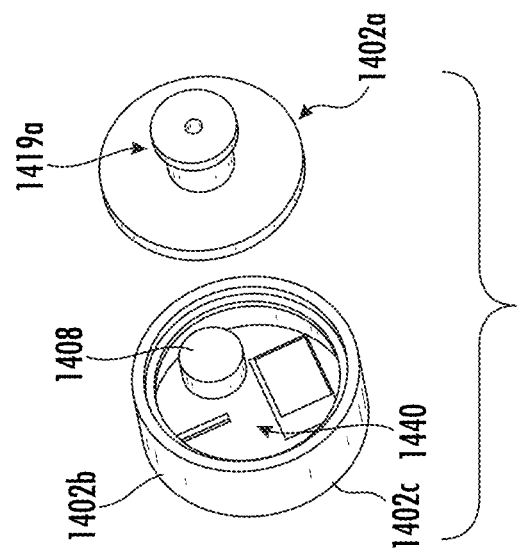
Figure 14A:
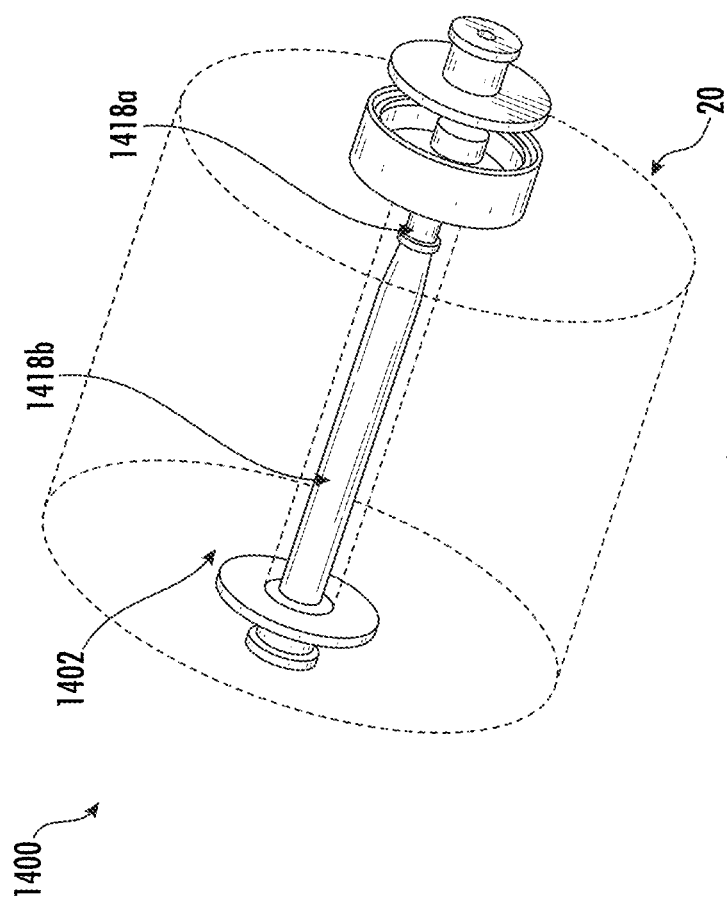

With reference now to FIGS. 14A-B, another example product level tracking system 1400 according to some embodiments of the present invention is depicted. The system 1400 is similar to the system 1000 discussed above with reference to FIGS. 10A-B, for example, in that the system 1000 comprises a housing 1402 that is configured to rotate with a sheet product roll 20 mounted thereon, but differs in that the compartment of the housing 802 within which a product level sensor 1440, a processor (not shown), a communications module (not shown), and a battery 1408 may at least partially be contained is not configured to be disposed in the bore of the sheet product roll. Rather, as best shown in FIG. 14A, the compartment of the housing 1402 is configured to be disposed between a side of the roll 20 and an inner surface of the dispenser 10 when mounted within the dispenser. Whereas the above-described example embodiment of the housing 1202 of FIGS. 12A-B is depicted as being configured to receive one or more "AAA" cell batteries in order to energize one or more of the product level sensor, processor, and communications module, the size of the compartment of the housing 1402 may be constrained such that the compartment may comprise one or more electrical contacts for coupling to a battery having a lower profile (e.g., a button cell such as a CR2032 battery as shown in FIG. 14B by way of non-limiting example). In particular, the compartment of housing 1402 is defined by an outer plate 1402a, an inner plate 1402c, and a sidewall 1402b extending therebetween. The outer plate 1402 comprises an installation protrusion 1419a extending therefrom, while the inner plate 1402c may be coupled to one of two telescoping elongate body portions 818a,b that enable the housing 802 to be compressed and extended along the bore's longitudinal axis. For example, one or more springs disposed within the elongate body portions 1418a,b may bias the housing 1402 into an extended state. As such, a user may compress the housing 1402 to enable insertion of installation protrusions 1419a,b into the corresponding installation holes 16 on the inner surface 14a of the compartment 14.

Because the spindle-shaped housings 1202 and 1402 are configured for removable mounting to a dispenser and may contain the more expensive electronic components relative to various other systems in accordance with the present teachings, it may be preferable in some embodiments to include one or more additional security features such as a tether or additional sensor to indicate when authorized removal has occurred to prevent loss and/or swapping from one stall to another.

Due to the constraints on the size of batteries that may be disposed within embodiments of housings as disclosed herein, various embodiments may preferably be configured to conserve the limited electrical supply as discussed above. Moreover, rather than rely on relatively high-power product level sensors, some systems in accordance with the present teachings may utilize a mechanical product level sensor that interacts directly with the sheet product as it is dispensed from the roll in order to reduce the consumption of electrical energy. Various example mechanical product level sensors discussed above, for example, may generally move from a first position to a second position only when the roll is in need of replacement or about to need replacement. In some such example embodiments, because movement of the product level sensor may be effective to close a circuit only upon the sheet product being depleted below a threshold level, for example, energy may generally be conserved when the product level sensor is in the first (open circuit) position. Additionally, in some embodiments, the mechanical product sensors may be configured to reset upon a replacement sheet product roll being provided to the dispenser. By way of example, the mechanical product sensor may move from the first position to the second position, thereby opening the circuit and indicating to the processor that a replacement sheet product roll has been provided.

As above, in some example embodiments of a "low power" mode, the processor 860 of FIGS. 8A-C, for example, may prevent the communications module 180 from transmitting data, attempting to pair, and/or advertising with a remote computing device unless and until the processor 860 determines the occurrence of the need for a replacement roll or another "high priority" event such as the switch 840 being moved to the second position (e.g., indicating the need for a replacement roll), the remaining charge on the batteries being below a threshold level (e.g., below a 10% battery capacity), and/or the occurrence of any other event indicating a need for service of the portion of the system 800 coupled to the dispenser 10 (e.g., detection of a fault). Additionally, in some embodiments, the high priority events may be defined to include an indication that a previously-determined service need has been addressed, for example, when the processor 860 determines that the switch has been reset to the first position (e.g., indicating that a replacement roll has been provided) or upon the system 800 being powered up and that the remaining charge on the batteries is above a threshold level (e.g., above 50% battery capacity, indicating that batteries have been replaced). In such aspects, the example system 800 may thus consume minimal energy unless service is required and/or to provide notification that service has been provided.

Additionally, by way of example, when the switch 840 is in the first position (FIG. 9A) such that the roll has sufficient sheet product for one or more future uses, the processor 860 may generally cause the local portion of the system 800 to operate in lower power mode, thereby limiting transmissions initiated by the communications module 880 to only pre-defined "advertising mode" intervals. Upon the switch being moved to the second position (FIG. 9B) (or upon the occurrence of another high priority event), however, the processor 860 may cause the communications module 880 to initiate a pairing (e.g., with a remote wireless communication interface) so as to enable a notification to be provided to the remote computing device 830, indicating a state change of the switch 840 (or other desirable data, such as a low battery capacity in response to a high priority event indicating a low battery). Likewise, in various embodiments, the processor 860 may cause the communications module 880 to send a message comprising product level data upon any occurrence of the switch 840 being moved between the first and second positions. In such embodiments, for example, the mobile computing device 830 and/or a different mobile computing device may be notified upon the processor 860 determining the switch 840 has been reset from the second position (FIG. 9B) to the first position (FIG. 9A), thereby indicating that the roll has been refilled, for example.

In addition to or as an alternative to maintaining the communications module 180 in a low or no power state during the low power mode of operation of system 800 as discussed above, the processor 860 itself may be maintained in a relatively low power state, for example, between intermittent determinations of whether there is a need for service as otherwise discussed herein.

Figure 15:
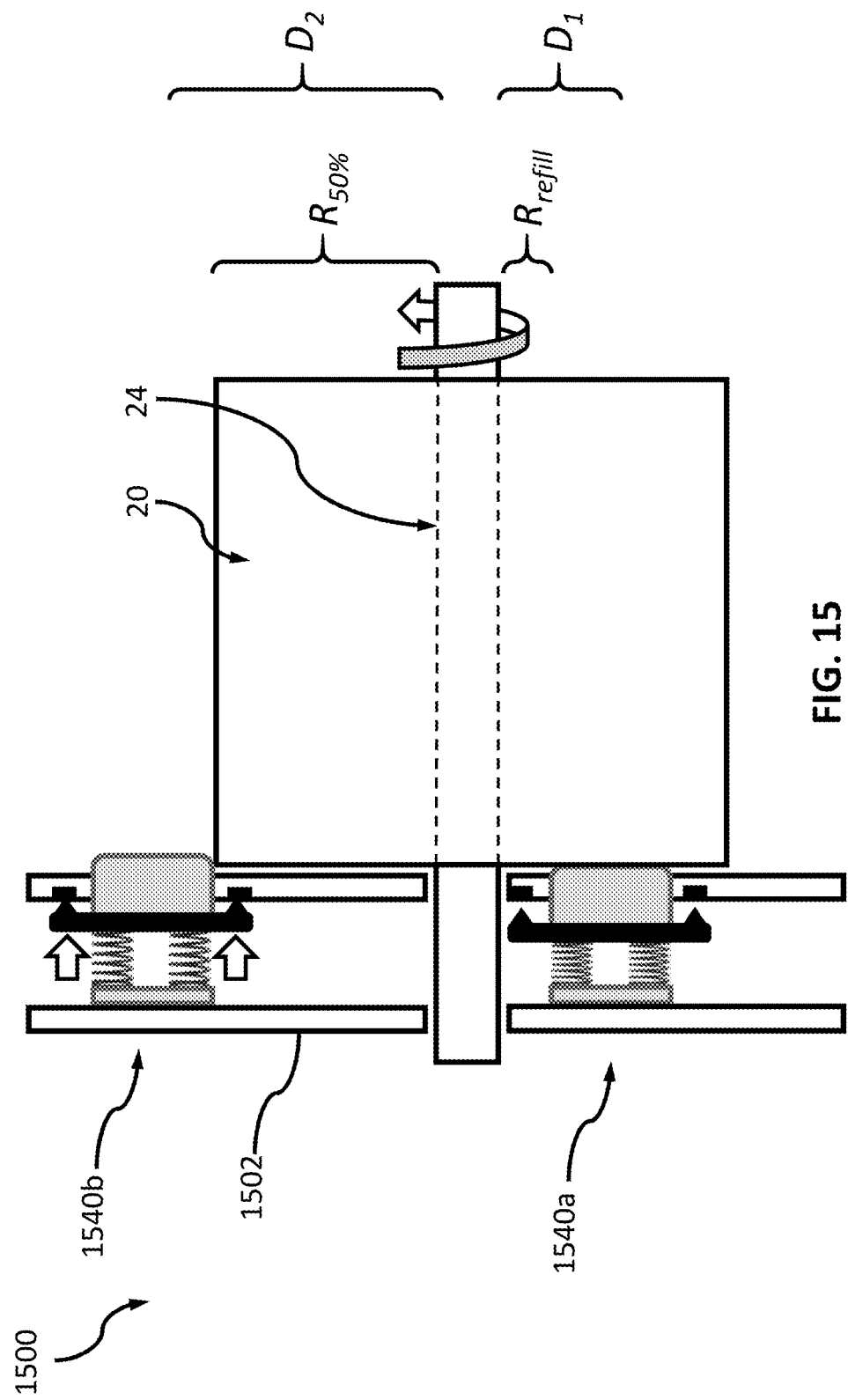

In some embodiments, multiple product level sensors may be used to determine when multiple different thresholds are met throughout the life of the product roll. For example, with reference to the system 1500 of FIG. 15, another example embodiment in accordance with the present teachings is depicted in which a plurality of mechanical product level sensors are disposed at a variety of locations in order to provide product level data relative to multiple thresholds. As shown in FIG. 15, each of the example switches (e.g., first switch 1540a and second switch 940b) are similar to switch 840 of FIGS. 9A-B but differ in that they extend from the housing at different positions so as to indicate when the quantity of sheet product remaining on product roll 20 is below different thresholds. In particular, when the quantity of sheet product remaining on the product roll 20 is depleted beyond the threshold ($R_{50}$%) represented by the inner radial surface of the second switch 1540b, the spring(s) extend such that the second switch 1540b moves toward its biased configuration, thereby providing an electrical signal indicating that the second switch 1540b has moved from its first position to its second position and signifying that the product roll 20 has approximately 50% (or less) remaining inventory of sheet product. In this regard, the second switch 1540b may be mounted a second radial distance $D_2$ away from the central bore 24, which may correspond to the product roll 20 having 50% (or less) remaining inventory of sheet product. On the other hand, the first switch 1540a (like switch 840 of FIGS. 9A-B), may be mounted a second radial distance $D_1$ away from the central bore 24, which may correspond to the product roll 20 having 10% (or less) remaining inventory of sheet product. In this regard, for example, the first switch 1540a may be located so as to indicate that the threshold $R_{refill}$ has been passed (e.g., thereby indicating that replacement product roll is needed).

In some embodiments, depending on the desired configuration of the system, two or more product level sensors (each associated with a different threshold) may be used in accordance with the present teachings to enable a user to track the product remaining at a plurality of different levels. For example, a particular facility may want to know when the roll is "low" in addition to when it is "out" so as to be forewarned of an impending "out" before it happens to enable the dispenser to be restocked (e.g., before an expected high-consumption time such as halftime of a sporting event). Additionally, it will be appreciated that providing multiple product level sensors may enable the local processor or a processor associated with a remote computing device to calculate a "rate of consumption" related to the time between each switch threshold being passed, which may help predict when replacement of a product roll is likely to be needed. Notably, the example product level sensors 1540a, 1540b may be used with any example product level tracking system described herein.

Figure 16:
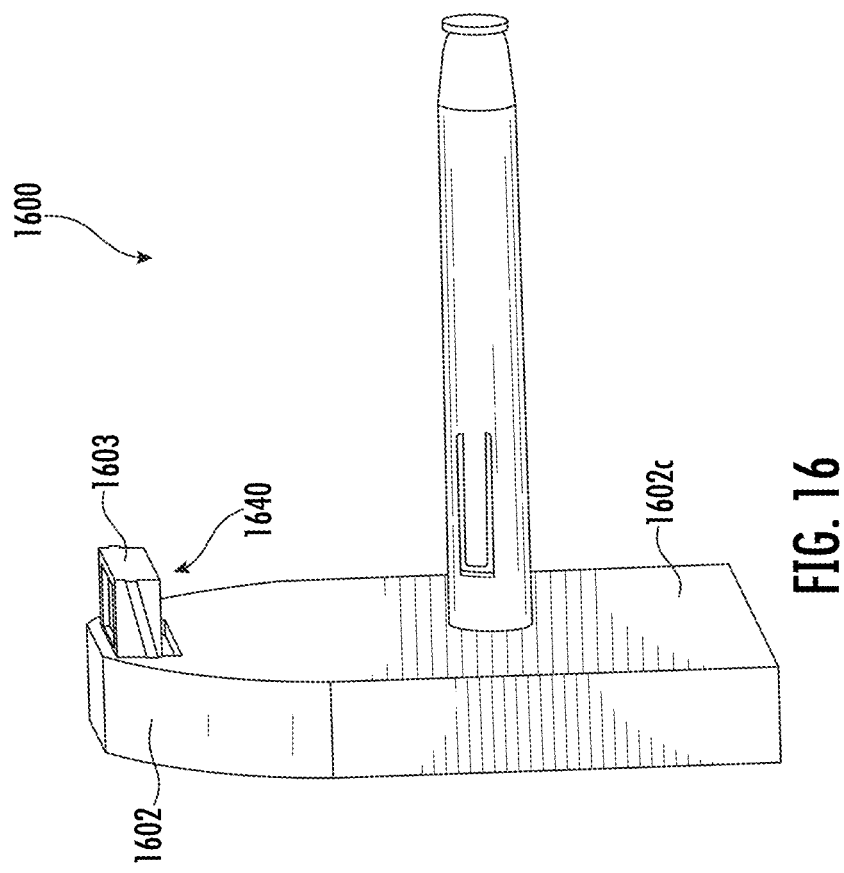
FIG. 16 shows another example product level tracking system in accordance with some embodiments discussed herein.

Indeed, in some aspects, systems in accordance with the present teachings can include a product level sensor of one type (e.g., a mechanical sensor) and a product level sensor of a different type (e.g., a proximity product level sensor). With reference to FIG. 16, for example, a mechanical switch can additionally be provided as discussed above, for example, to limit the use (and thus energy consumption) of a higher-energy product level sensor until an initial threshold has been detected by the mechanical product level sensor. For example, as discussed above with reference to FIG. 15, a switch (e.g., switch 1540b) can be provided at or below the level capable of being measured by a time-of-flight product level sensor 140 of FIGS. 2A-4 such that power would not be provided to the time-of-flight sensor 140 until a relevant threshold is met, thereby conserving energy.

Figure 17:
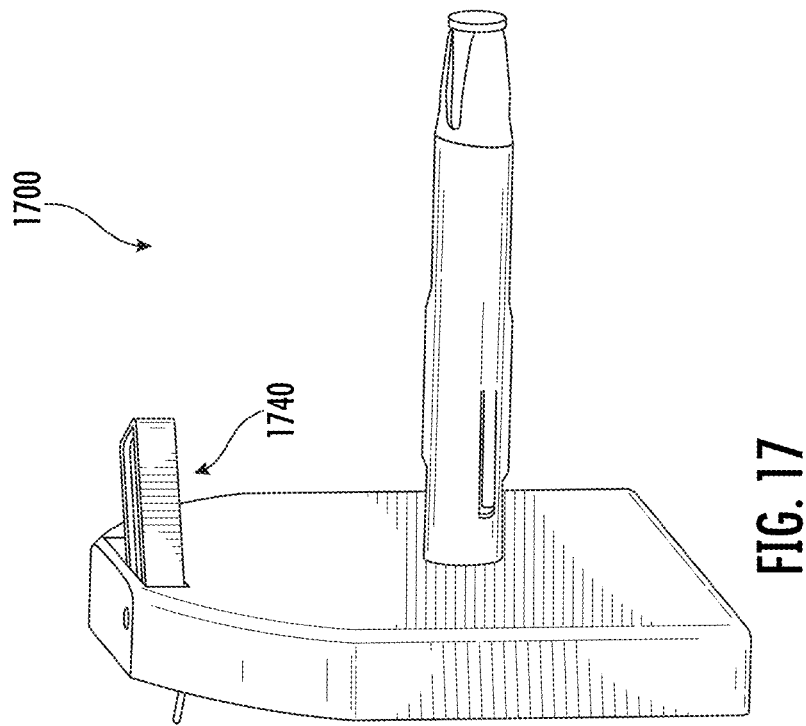
FIG. 17 shows another example product level tracking system in accordance with some embodiments discussed herein.

With reference now to FIGS. 16 and 17, some example aspects of the present teachings alternatively provide for limiting consumption of energy until the proximity product level sensor is mechanically moved from a retracted position to an extended position. As shown in FIG. 16, for example, system 1600 is similar to that of FIG. 2B in that it includes a proximity product level sensor 1640 within the housing 1602. However, rather than have a recess 102d through which the sensor 140 emits and detects light as in FIG. 2B, the light source and detector of sensor 1640 are instead contained within the housing 1602 until the sheet product level of the roll is below the level of the slide 1603. While the slide 1603 containing the sensor 1640 is biased to extend away from the inner plate 1602c of housing 1602, a roll having a sufficient diameter may be effective to compress the slide 1603 to its retracted position, indicating that the proximity sensor does not need power supplied thereto. Upon sufficient depletion of the sheet product inventory, however, the slide 1603 may extend to its biased configuration shown in FIG. 16 and the proximity product level sensor 1640 may be activated as otherwise discussed herein.

The system 1700 of FIG. 17 is similar to that of FIG. 16, but rather than translating outwardly from the inner surface of the housing as with slide 1603, the sensor 1740 may instead rotate out (e.g., pivot) of the housing 1702 when the inventory of the roll is below the threshold level via the action of a spring, for example.

Example Flowchart(s)

Embodiments of the present invention provide methods, apparatuses and computer program products for operating example inventory tracking systems according to various embodiments described herein. Various examples of the operations performed in accordance with embodiments of the present invention will now be provided with reference to FIG. 18.

Figure 18:
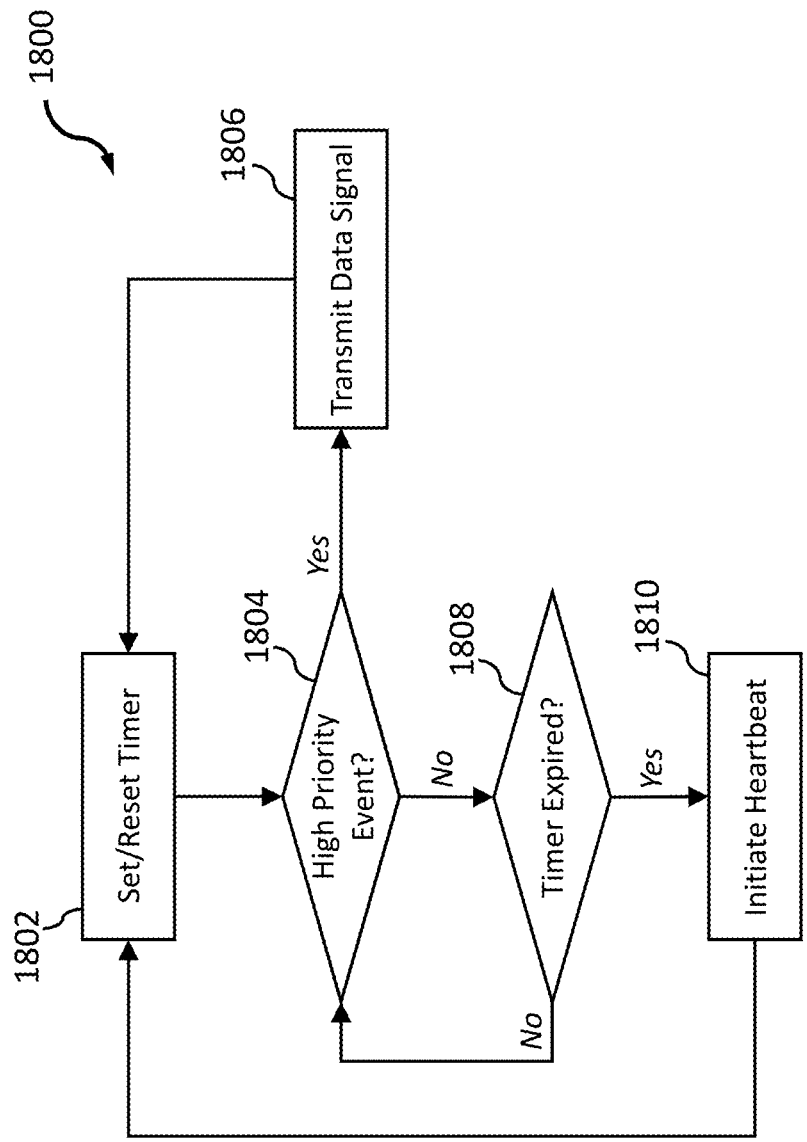
FIG. 18 illustrates a flowchart detailing an example method of operating example product level tracking systems, in accordance with some embodiments discussed herein.

FIG. 18 illustrates a flowchart according to an example method for operating an example product level tracking system according to an example embodiment. The operations illustrated in and described with respect to FIG. 18 may, for example, be performed by, with the assistance of, and/or under the control of one or more of the components of example product level tracking systems described herein, such as systems 100, 500, 700, 800, 1000, 1200, 1400, 1500, 1600, and 1700. Such an example method 1800 provides for efficient use of electrical energy (e.g., to preserve battery life), while still providing appropriate data to the remote computing device.

The method 1800 may include setting/resetting a timer for determining expiration of a predefined interval at operation 1802. Operation 1804 illustrates an example of a continuous check as to whether a High Priority Event has occurred.

If a High Priority Event occurs, such as described herein, the method 1800 proceeds to operation 1806 where a data signal is sent to a remote computing device (e.g., a paired communication mode may be utilized and data, such as product level data, may be transmitted to the remote computing device). After such communication is sent, the method 1800 may return to operation 1802 to reset the timer.

If there is not a detection of a High Priority Event, the method 1800 proceeds to operation 1808 to check whether the timer has expired. If the timer has not expired, the method 1800 returns to operation 1804 to continue the checking loop. However, if the timer expires or has expired, the method 1000 initiates a "heartbeat" communication at operation 1810. In this regard, the "heartbeat" communication may include transmitting data to a remote computing device to indicate that the product level tracking system is, for example, still operating. Such a communication may utilize any communication mode, such as advertising mode or paired mode as described herein, and may transmit any type of data (e.g., a device identifier, etc.). After such communication is sent, the method 1800 may return to operation 1802 to reset the timer.

FIG. 18 illustrates an example flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, a processor such as described herein. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A system for providing automatic product level tracking functionality to a sheet product roll dispenser, the system comprising:
a product level sensor configured to provide an indication when a quantity of sheet product on a sheet product roll mounted within the sheet product dispenser is depleted below a threshold quantity;
a communications module configured to transmit product level data related to the indication to a remote computing device based on a determination that the product level sensor provided the indication, wherein the product level data is indicative of the quantity of sheet product on the sheet product roll, wherein transmission of product level data to the remote computing device by the communications module includes transmission of other event data to the remote computing device; and
an electrically conductive contact configured to be in contact with a terminal of one or more batteries for providing electrical power to at least one of the product level sensor and the communications module.

2. The system of claim 1, wherein the system is configured to be coupled to the sheet product roll dispenser while the sheet product roll dispenser is installed on one of a wall or a partition such that the sheet product roll dispenser is retrofitted with the system.

3. The system of claim 1, wherein the product level sensor is biased.

4. The system of claim 1, wherein movement of the product level sensor to provide the indication is configured to close a circuit.

5. The system of claim 1, wherein the sheet product roll comprises a central bore extending along a longitudinal axis from a first side to a second side, and wherein at least a portion of the product level sensor is configured to be disposed in contact with the first side of the sheet product roll when the sheet product roll is in a first position.

6. The system of claim 5, further comprising a housing at least partially containing the product level sensor, the communications module, and the electrically conductive contact, wherein the housing is configured to be coupled to the sheet product dispenser between an inner surface of the sheet product dispenser and the first side of the sheet product roll mounted on a spindle within the sheet product dispenser.

7. The system of claim 6, wherein the housing comprises an outer plate, an inner plate, and sidewall extending therebetween, the inner plate defining an opening through which at least a portion of the product level sensor extends to be disposed in contact with the first side of the sheet product roll.

8. The system of claim 7, wherein each of the inner and outer plate comprises a bore through which the spindle engages a spindle-receiving cavity on the inner surface of the sheet product dispenser.

9. The system of claim 5, wherein the product level sensor is a first product level sensor and is mounted so as to contact the first side of the sheet product roll when in the first position at a first radial distance from the central bore, wherein the threshold quantity is a first threshold quantity, wherein the system includes a second product level sensor that is configured to provide a second indication when a quantity of sheet product on the sheet product roll mounted within the sheet product dispenser is depleted below a second threshold quantity, wherein the second product level sensor is mounted so as to contact the first side of the sheet product roll when in a first position at a second radial distance from the central bore, wherein the second radial distance is smaller than the first radial distance, and wherein the second threshold quantity is smaller than the first threshold quantity.

10. The system of claim 1, wherein the product level sensor is configured to move from a first position to a second position when the quantity of sheet product on the sheet product roll mounted within the sheet product dispenser is depleted below the threshold quantity, and wherein, when the product level sensor is in the first position, transmissions initiated by the communications module are limited until the product level sensor is moved to the second position.

11. The system of claim 1, wherein the indication provided by the product level sensor is a first high priority event from among a plurality of high priority events, and wherein transmission of product level data to the remote computing device by the communications module is only allowed upon detection of at least one of the plurality of high priority events.

12. The system of claim 11, wherein a second high priority event from among the plurality of high priority events is an event from the group consisting of a charge remaining on the one or more batteries coupled to the electrically conductive contact being below a threshold level, the product level sensor being reset, the replacement of the one or more batteries, and a detection of a fault.

13. The system of claim 1, wherein, other than upon determination that the product level sensor provided the indication, transmissions initiated by the communications module are limited to pre-defined intervals.

14. The system of claim 13, wherein the pre-defined intervals are at most about an hour.

15. The system of claim 1, wherein transmission of product level data to the remote computing device by the communications module is only allowed upon at least one of:
an occurrence of a heartbeat, or
the determination that the product level sensor provided the indication.

16. The system of claim 1, wherein the other event data includes at least one of battery data, device identifier data, or other dispenser data.

17. An apparatus for providing automatic product level tracking functionality to a sheet product roll dispenser, the apparatus comprising:
a housing configured to be coupled to the sheet product roll dispenser, the housing at least partially containing:
a product level sensor configured to provide an indication when a quantity of sheet product on a sheet product roll mounted within the sheet product dispenser is depleted below a threshold quantity;
a communications module configured to transmit product level data to a remote computing device based on a determination that the product level sensor provided the indication, wherein the product level data is indicative of the quantity of sheet product on the sheet product roll when the product level sensor provided the indication, wherein transmission of product level data to the remote computing device by the communications module includes transmission of other event data to the remote computing device; and an electrically conductive contact configured to be in contact with a terminal of one or more batteries for providing electrical power to the product level sensor and the communications module; and one or more mounting features configured to enable coupling of the housing to the sheet product dispenser.

18. A method of tracking product level of a sheet product roll dispenser, the method comprising:

providing a product level tracking system comprising:
a product level sensor configured to move from a first position to a second position when a quantity of sheet product on a sheet product roll mounted within the sheet product dispenser is depleted below a threshold quantity;

determining, via the processor, one of occurrence of a high priority event or expiration of a pre-defined time interval; and, in response thereto:
determining product level data indicative of a quantity of sheet product on the sheet product roll mounted in the sheet product dispenser;
causing transmission of the product level data to a remote computing device; and
causing resetting of a timer for determining expiration of the pre-defined time interval, wherein the high priority event includes an event from a group of events including an instance in which the product level sensor moves to the second position, wherein the sheet product roll comprises a central bore extending along a longitudinal axis from a first side to a second side, wherein at least a portion of the product level sensor is configured to be disposed in contact with the first side of the sheet product roll when in the first position, and wherein the product level sensor is a first product level sensor and is mounted so as to contact the first side of the sheet product roll when in the first position at a first radial distance from the central bore, wherein the threshold quantity is a first threshold quantity, wherein the system includes a second product level sensor that is configured to move from a first position to a second position when a quantity of sheet product on the sheet product roll mounted within the sheet product dispenser is depleted below a second threshold quantity, wherein the second product level sensor is mounted so as to contact the first side of the sheet product roll when in the first position at a second radial distance from the central bore, wherein the second radial distance is smaller than the first radial distance, and wherein the second threshold quantity is smaller than the first threshold quantity.

19. The method of claim 18, wherein the group of events further includes requiring service at the dispenser, and an event of service being provided at the dispenser.

20. The method of claim 18, wherein the group of events further includes a charge remaining on one or more batteries coupled to the product level tracking system being below a threshold level, and a detection of a fault.

21. The method of claim 18, wherein the group of events further includes the product level sensor being reset to the first position, and the replacement of one or more batteries for the product level tracking system.

22. The method of claim 18, wherein the pre-defined interval is at most about an hour.

* * * * *